US012670000B2

(12) United States Patent
Vukojevic et al.

(10) Patent No.: US 12,670,000 B2
(45) Date of Patent: Jun. 30, 2026

(54) DATA CENTER RESOURCE ORCHESTRATION USING SERVERLESS APPLICATION PROGRAMMING INTERFACES

(71) Applicant: NVIDIA Corporation, Santa Clara, CA (US)

(72) Inventors: Bojan Vukojevic, Pleasanton, CA (US); Cameron Moore, San Jose, CA (US); Nagesh Prafulla Bhole, Pune (IN); John T. Richards, Wheeling, WV (US); Frank James Spitulski, Gilroy, CA (US); Sanjay Saxena, San Jose, CA (US); Anand Parthasarathi, Apex, NC (US)

(73) Assignee: NVIDIA Corporation, Santa Clara, CA (US)

( * ) Notice: Subject to any disclaimer, the term of this patent is extended or adjusted under 35 U.S.C. 154(b) by 63 days.

(21) Appl. No.: 18/680,156

(22) Filed: May 31, 2024

(65) Prior Publication Data

US 2025/0370766 A1     Dec. 4, 2025

(51) Int. Cl.
*G06F 9/44* (2018.01)
*G06F 9/38* (2018.01)
*G06F 9/445* (2018.01)
*G06T 1/20* (2006.01)

(52) U.S. Cl.
CPC ............ *G06F 9/44505* (2013.01); *G06F 9/38* (2013.01); *G06T 1/20* (2013.01)

(58) Field of Classification Search
CPC ....................................................... G06F 1/32
See application file for complete search history.

(56) References Cited

U.S. PATENT DOCUMENTS

| | | | |
|---|---|---|---|
| 2014/0136257 A1* | 5/2014 | Amulu ................. | G06Q 10/067 705/7.15 |
| 2014/0181828 A1* | 6/2014 | Bird ...................... | G06F 9/5066 718/103 |
| 2014/0276564 A1* | 9/2014 | Schneider ............. | A61M 5/142 604/151 |
| 2018/0033114 A1* | 2/2018 | Chen ...................... | G06T 15/80 |

* cited by examiner

*Primary Examiner* — Keshab R Pandey
(74) *Attorney, Agent, or Firm* — Lowenstein Sandler LLP

(57) ABSTRACT

Disclosed are systems and techniques for a cloud function worker for executing code using graphics processing units (GPUs) in a serverless architecture. The techniques include receiving, at a cloud function worker, a first cloud function execution request from a cloud function queue of a cloud function controller, executing a first instance of a code based on the first cloud function execution request using at least a graphics processing unit (GPU) of a cluster environment hosting the cloud function worker, determining first metrics of the GPU of the cluster environment, responsive to the first metrics of the GPU satisfying a bandwidth criterion, requesting a second cloud function execution request from the cloud function queue of the cloud function controller, and executing, concurrent with execution of the first instance of the code, a second instance of the code based on the second cloud function execution request.

20 Claims, 12 Drawing Sheets

400

MAINTAIN, USING A CONTROLLER, A PLURALITY OF QUEUES FOR A PLURALITY OF WORKERS IMPLEMENTED USING A PLURALITY OF CLUSTER ENVIRONMENTS 402

STORE A FIRST EXECUTION REQUEST OF AN ENTITY IN A FIRST QUEUE OF THE PLURALITY OF QUEUES 404

RECEIVE, FROM A FIRST WORKER OF THE PLURALITY OF WORKERS IMPLEMENTED USING A FIRST CLUSTER ENVIRONMENT OF THE PLURALITY OF CLUSTER ENVIRONMENTS, A FIRST EXECUTION RESULT CORRESPONDING TO THE FIRST EXECUTION REQUEST OF THE ENTITY 406

CAUSE THE FIRST EXECUTION RESULT TO BE PROVIDED TO THE ENTITY 408

FIG. 4

RECEIVE A CLUSTER REGISTRATION FROM A FIRST AGENT HOSTED BY THE FIRST CLUSTER ENVIRONMENT 502

GENERATE A WORKER DEPLOYMENT REQUEST FOR EXECUTION BY THE FIRST AGENT TO DEPLOY THE FIRST WORKER USING THE FIRST CLUSTER ENVIRONMENT 504

600

RECEIVE, USING A WORKER, AN EXECUTION REQUEST FROM A QUEUE OF A CONTROLLER 602

IDENTIFY A FIRST ARTIFICIAL INTELLIGENCE (AI) MODEL OF A PLURALITY OF AI MODELS OF THE CONTROLLER 604

GENERATE AN EXECUTION RESULT CORRESPONDING TO THE EXECUTION REQUEST USING THE FIRST AI MODEL AND AT LEAST A GRAPHICAL PROCESSING UNIT OF A CLUSTER ENVIRONMENT HOSTING THE WORKER 606

CAUSE THE EXECUTION RESULT TO BE TRANSMITTED TO THE CONTROLLER 608

FIG. 6

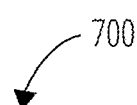

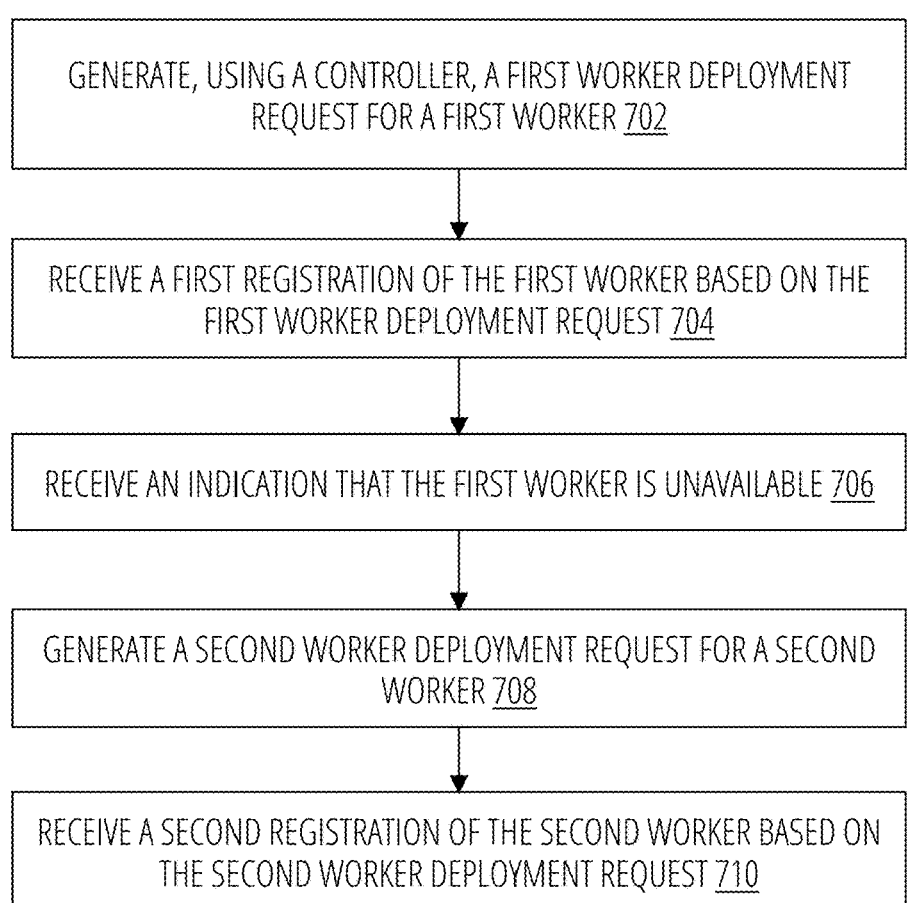

GENERATE, USING A CONTROLLER, A FIRST WORKER DEPLOYMENT REQUEST FOR A FIRST WORKER 702

RECEIVE A FIRST REGISTRATION OF THE FIRST WORKER BASED ON THE FIRST WORKER DEPLOYMENT REQUEST 704

RECEIVE AN INDICATION THAT THE FIRST WORKER IS UNAVAILABLE 706

GENERATE A SECOND WORKER DEPLOYMENT REQUEST FOR A SECOND WORKER 708

RECEIVE A SECOND REGISTRATION OF THE SECOND WORKER BASED ON THE SECOND WORKER DEPLOYMENT REQUEST 710

FIG. 7

RECEIVE, USING A WORKER, A FIRST EXECUTION REQUEST FROM A
QUEUE OF A CONTROLLER 802

EXECUTE A FIRST INSTANCE OF A CODE BASED ON THE FIRST EXECUTION
REQUEST USING AT LEAST A GRAPHICAL PROCESSING UNIT (GPU) OF A
CLUSTER ENVIRONMENT HOSTING THE WORKER 804

DETERMINE FIRST METRICS OF THE GPU OF THE CLUSTER
ENVIRONMENT 806

RESPONSIVE TO THE FIRST METRICS OF THE GPU SATISFYING A
BANDWIDTH CRITERION, REQUEST A SECOND EXECUTION REQUEST
FROM THE QUEUE OF THE CONTROLLER 808

EXECUTING, AT LEAST PARTIALLY CONCURRENTLY WITH EXECUTION OF
THE FIRST INSTANCE OF THE CODE, A SECOND INSTANCE OF THE CODE
BASED ON THE SECOND EXECUTION REQUEST USING AT LEAST THE GPU
OF THE CLUSTER ENVIRONMENT 810

FIG. 8

DATA CENTER RESOURCE ORCHESTRATION USING SERVERLESS APPLICATION PROGRAMMING INTERFACES

TECHNICAL FIELD

At least one embodiment pertains to a system for workers that execute code in parallel using graphics processing units in a serverless architecture.

BACKGROUND

Some compute tasks are more efficient to execute using a graphics processing unit (GPU) versus a traditional central processing unit (CPU). However, configuring a service that can be used by remote clients to execute code on a GPU can be difficult, and may involve concerns about the infrastructure, scalability, firewall, and other security.

BRIEF DESCRIPTION OF THE DRAWINGS

FIG. 4 is a flow diagram of an example method for managing a plurality of queues for a plurality of workers implemented using a plurality of cluster environments, according to at least one embodiment;

FIG. 6 is a flow diagram of an example method for generating an execution result, according to at least one embodiment;

FIG. 7 is a flow diagram of an example method for deploying workers implemented using multiple cluster environments, according to at least one embodiment;

FIG. 8 is a flow diagram of an example method for concurrently executing requests, according to at least one embodiment;

DETAILED DESCRIPTION

Figure 1:
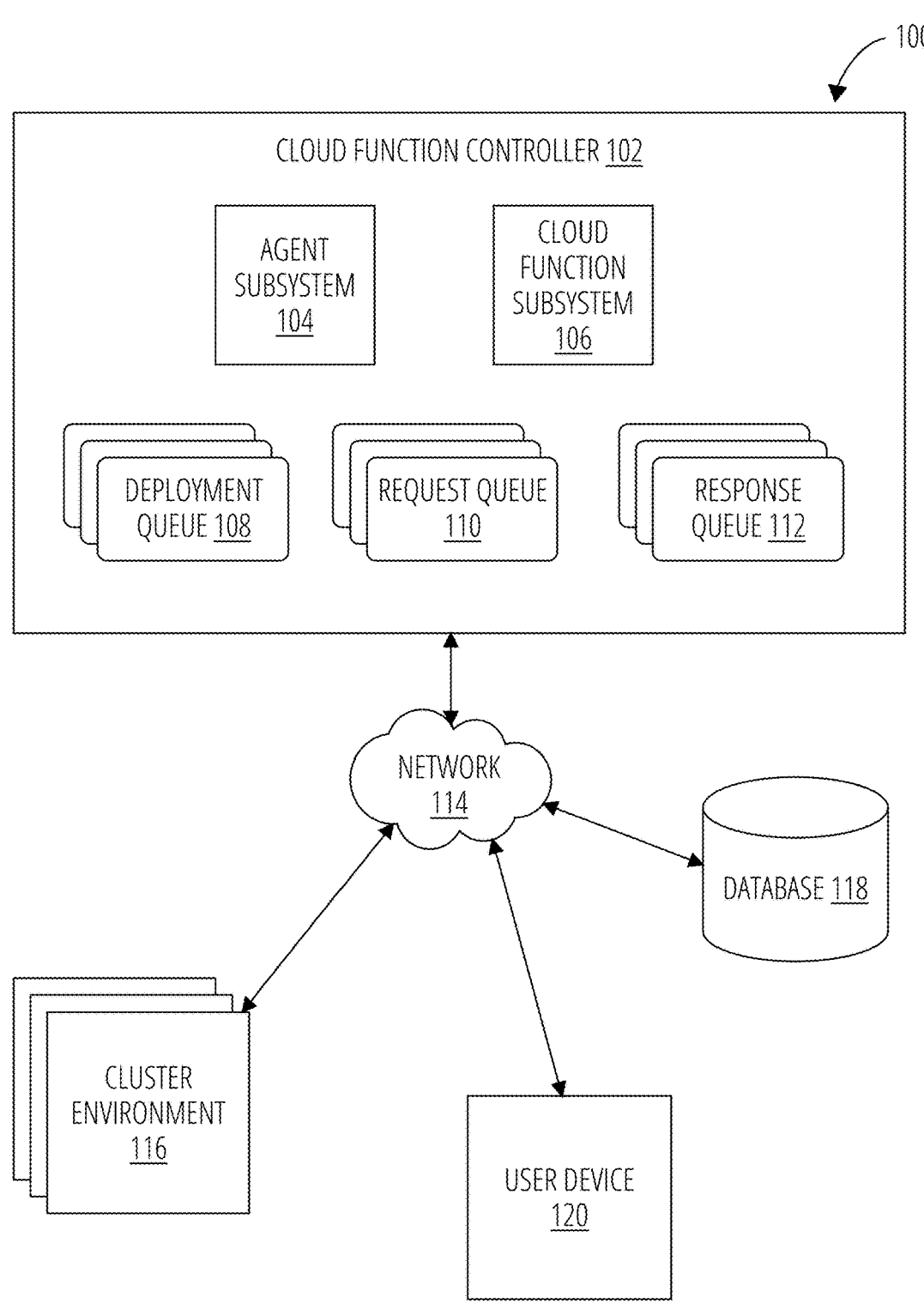
FIG. 1 is a block diagram of an example computer system for executing code using graphics processing units in a serverless architecture, according to at least one embodiment.

The present disclosure describes systems and techniques that allow for execution of GPU cloud functions in a serverless architecture.

Aspects of the present disclosure address the above and other concerns by providing a serverless architecture that allows for execution of cloud functions using a GPU without requiring a user (or a service provider, entity, etc.) to configure any services or manage any infrastructure (e.g., servers, virtual machines, etc.). For example, a serverless architecture may allow a user to request execution of code without needing to manage a server (or virtual machine, etc.), perform security updates on the server, keep backups of the server in case of failures, etc. In some embodiments, the serverless architecture of the present disclosure can include a central controller and one or more workers deployed in one or more clusters (e.g., computing environments, such as cloud service provider environments, private datacenter environments, and the like). Each cluster can include an agent that communicates with the central controller and spawns workers within the cluster as needed.

For example, an agent can be deployed within a cluster. The agent can register the cluster with a central controller and can inform the central controller of the computing resources of the cluster (e.g., number of graphics processing units (GPUs), type of each GPU, memory capacity of each GPU, etc.). In some embodiments, the agent and corresponding cluster are associated with a specific user (e.g., an entity, an organization, etc.). The agent can be associated with a worker deployment queue. As worker deployment requests are added to the worker deployment queue, if the agent's cluster has available computing bandwidth, the agent can obtain one of the requests from the queue and deploy a worker within the agent's cluster based on properties of the worker deployment request. For example, the worker deployment request can include one or more properties that define what kind of worker should be deployed. The properties can identify a machine learning model that should be used by the worker, a container or a virtual machine (VM) that should be used by the worker for performing one or more tasks or functions associated with the machine learning model, a group of containers and/or VMs that should be used by the worker, and/or the like.

According to some aspects of the disclosure, one or more cloud functions can be registered with the central controller. Each cloud function can include one or more attributes, such as the GPU requirements for executing the cloud function, a minimum number of workers to be associated with the cloud function, a maximum number of workers to be associated with the cloud function, and the like. The cloud function can include code to be executed when the cloud function is invoked. The code may be a machine learning model used to perform an inference task, a container or VM environment for training a machine learning model, a group of containers and/or VMs to be executed, and/or another code to be executed by a GPU. The central controller can create a cloud function queue associated with the cloud function. As the central controller receives requests to execute a particular cloud function using a given input (a "cloud function execution request," or simply an "execution request"), the execution request can be put in the cloud function queue corresponding to the requested cloud function.

According to some aspects of the disclosure, after the cloud function is registered with the central controller, the central controller can add worker deployment requests associated with the cloud function to one or more worker deployment queues. The worker deployment requests can be generated based on properties of the cloud function. For example, the worker deployment requests can include the code to be executed by the worker associated with the cloud function, the minimum number of workers to be deployed, and the like. The central controller can add the generated worker deployment requests to worker deployment queues based on the GPU requirements of the cloud function associated with the worker deployment requests. For example, worker deployment requests for a cloud function that need to be executed on a specific graphics processing unit should be put in a worker deployment queue with an associated agent/cluster that has the specific graphics processing unit available, and not in a worker deployment queue with an agent/cluster that does not have the specific graphics processing unit available. As discussed above, as the worker deployment requests can be added to worker deployment queues, agents can obtain requests from the queue and can deploy workers based on the worker deployment requests.

According to some aspects of the disclosure, workers can be deployed in a cluster by an agent and be responsible for managing execution of cloud functions using the computing resources of their corresponding cluster. Each worker can include multiple components, such as an initialization component, a utility component, and a code component. The initialization component can perform operations necessary to prepare the worker to execute its associated cloud function. For example, the initialization component can download artificial intelligence (AI) model(s) that will be used by the code component during execution of the cloud function. In some embodiments, the initialization component may load the AI model(s) into memory (e.g., GPU memory). The initialization component can also download assets that are required by the code component.

According to some aspects of the disclosure, the utility component can interact with the central controller by receiving execution requests and by returning execution results. For example, the utility component can connect to the central controller and can obtain execution requests from a cloud function queue associated with the worker. The utility component can provide the input from the execution request to the code component for execution. When the execution is completed, the utility component can take the execution result from the code component and provide it to the central controller (e.g., by putting it in a cloud function result queue). The utility component can be designated (e.g., be the only process) to interact with the code component, increasing security of the code component.

According to some aspects of the disclosure, the code component can execute the cloud function execution request received from the utility component. The cloud function execution request can include input data (or an identifier (e.g., uniform resource locator (URL)) that can be used to access the input data) and an AI model identifier. Prior to execution of the request by the code component, the initialization component may have downloaded and loaded into memory the AI model corresponding to the AI model identifier of the execution request.

According to some aspects of the disclosure, the code component of the worker can include an AI inference server that can apply the AI model corresponding to the AI model identifier to the input data of the execution request. For example, the input data can be a text prompt for a generative AI model (e.g., a large language model (LLM), an image generation model, etc.). The code component can provide the text prompt to the AI model that has been loaded into memory to obtain the generative AI output (e.g., the generated natural language response, the generated image, etc.). The output can be provided to the utility component, which can provide the result to the central controller.

According to some aspects of the disclosure, the utility component can monitor the code component (e.g. may collect metrics from the code component). If, based on the collected metrics, the code component has additional bandwidth for execution, the utility component can obtain an additional task from the cloud function queue of the central controller and provide the additional task to the code component for execution in parallel with the already executing request.

Thus, according to some aspects of the disclosure, the central controller can be responsible for managing the cloud function execution requests that are to be executed, the agents that deploy workers, and the workers that execute the cloud function requests. As the central controller receives execution requests, each request may be assigned to a queue, thus converting each execution request from a synchronous request from a user into an asynchronous request to be executed by a worker. The execution request may be assigned to a queue corresponding to the requested cloud function. As a result of queueing execution requests as they are received by the central controller, workers can be protected from being overwhelmed with requests.

According to some aspects of the disclosure, workers can be responsible for executing requests received by the central controller. Workers can be deployed in computing environments controlled by cloud service providers, in data centers, and/or in private computing environments. Each worker can register with the central controller, thus establishing communication with the central controller without needing to open firewall ports or monitoring other network ingress problems (e.g., transport layer security (TLS) certificates, domain name service (DNS) records, rate-limiting, etc.). Upon registering with the central controller, the worker can be assigned to a particular cloud function queue. If there are execution requests in the queue waiting to be executed, the worker can obtain a request from the queue to begin execution. In some embodiments, if the worker has available bandwidth (e.g., if the computing resources of the worker are not fully saturated), one or more additional requests can be obtained from the queue and executed by the worker in parallel. After execution, the worker can return a result to the central controller. In some embodiments, the result is placed in a queue designated for holding execution results (separate from the queues for execution requests). The central controller can obtain results from the results queue and return the results to the respective users that submitted the cloud function execution request corresponding to each result.

According to some aspects of the disclosure, a cluster can be used for compute tasks independent of the deployed workers. For example, an entity can register their cluster of computing resources with the central controller (e.g., via an agent deployed in the cluster) and can continue to use the cluster for various tasks, in addition to the tasks executed by the workers that are deployed by the agent. If the agent of the cluster determines that the cluster does not have the bandwidth necessary to continue executing requests from the central controller (e.g., if a higher priority workload arrives to the cluster and the cluster utilization reaches a certain threshold), the agent can end ("kill") worker processes (e.g., a lower priority worker process) and notify the central controller. The central controller can put a new worker deployment request in the worker deployment queue. An agent of another cluster can obtain the worker deployment request from the worker deployment queue and can spawn a new worker in a new cluster environment to maintain the minimum number of workers requested for a particular cloud function and/or the minimum number of workers required to process incoming requests. In some embodiments, the new worker will be deployed in a cluster associated with a different cloud service provider than the cloud service provider of the first cluster.

The advantages of the disclosed techniques include but are not limited to execution of GPU cloud functions using available GPU resources across one or more cluster environments without configuring a service that can be used by remote clients to execute code on a GPU, which can be difficult and may involve infrastructure concerns, scalability concerns, firewall concerns, and other security concerns.

FIG. 1 is a block diagram of an example computer system 100 for executing code using graphics processing units in a serverless architecture, according to at least one embodiment. System 100 can include cloud function controller 102, cluster environment 116, user device 120, and database 118 connected to network 114. Network 114 can be a public network (e.g., the Internet), a private network (e.g., a local area network (LAN), or wide area network (WAN)), a wireless network, a personal area network (PAN), another network type, and/or a combination thereof.

Cloud function controller 102 can manage a plurality of cloud function queues for a plurality of workers in a plurality of cluster environments (e.g., computing environments, such as cloud service provider environments, private datacenter environments, and the like). Each cloud function can be a collection of code and/or AI model(s) that can be executed by one or more GPU resources of a cluster environment. Each worker can be one or more processes executing in a cluster environment and can cause execution of one or more cloud functions using computing resources of the cluster environment hosting the worker.

Cloud function controller 102 can include one or more applications running on a desktop computer, a laptop computer, a smartphone, a tablet computer, a server, a wearable device, a virtual reality (VR)/augmented reality (AR)/mixed reality (MR) headset or heads up display, a digital avatar or chat bot kiosk, an in-vehicle infotainment computing device, and/or any suitable computing device capable of performing the techniques described herein. Cloud function controller 102 can include agent subsystem 104, cloud function subsystem 106, deployment queue 108, request queue 110, and response queue 112. Each queue may represent a data structure that stores one or more data packets, which may include worker deployment request information, cloud function execution request information, cloud function execution response information, and/or the like. In some embodiments, the data packets in a queue are ordered in a first-in, first-out (FIFO) manner. In some embodiments, the data packets in a queue are ordered in a last-in, first-out (LIFO) manner. In some embodiments, data packets in a queue can be accessed out of order.

Agent subsystem 104 can manage agents deployed within cluster environments 116. Each agent can be one or more processes executing in a cluster environment and can cause one or more workers to be deployed within the cluster environment. For example, each cluster environment 116 can include an agent that communicates with cloud function controller 102 and spawns workers within the cluster as needed. An agent can register a cluster environment 116 with agent subsystem 104 and can inform cloud function controller 102 (e.g., by sending a cluster registration request) of the computing resources of the cluster (e.g., a number of GPUs, type of each GPU, memory capacity of each GPU, etc.). In some embodiments, the agent and corresponding cluster are associated with a specific user (e.g., an entity, an organization, etc.). The agent can be associated with a deployment queue 108 (e.g., a cloud function worker deployment queue). As worker deployment requests are added to a deployment queue 108, if the agent's cluster has available computing bandwidth, the agent can obtain one of the worker deployment requests from the queue and deploy (e.g., instantiate) a worker within the agent's cluster based on properties of the worker deployment request. For example, the worker deployment request can include one or more properties that define what kind of worker should be deployed. The properties can identify a machine learning model that the worker will execute, a container that the worker will execute, a group of containers that the worker will execute, and/or the like.

Cloud function subsystem 106 can manage a plurality of cloud functions. For example, an entity can register a cloud function with cloud function controller 102. The cloud function can have one or more associated attributes, such as the GPU requirements for executing the cloud function, a minimum number of workers to be associated with the cloud function, a maximum number of workers to be associated with the cloud function, and the like. The cloud function can include code to be executed when the cloud function is invoked. The code may be a machine learning model used to perform an inference task, a container environment for training a machine learning model, a group of containers to be executed, and/or another code to be executed by a GPU. Upon registration of the cloud function, cloud function subsystem 106 can create one or more queues associated with the cloud function. For example, cloud function subsystem 106 can create a request queue 110 for storing cloud function execution requests and a response queue 112 for storing cloud function execution results. As cloud function controller 102 receives requests to execute a particular cloud function using a given input (a "cloud function execution request," or simply an "execution request"), the execution request can be put in the request queue 110 (e.g., cloud function queue) corresponding to the requested cloud function. The cloud function execution request can include information such as a cloud function identifier, an input value for the cloud function, information related to the requesting user (e.g., entity, organization, user account, etc.), and/or the like. Cloud function execution results can include output of the executed cloud function. For example, if the cloud function includes execution of an AI model, the cloud function execution result can be the output of the AI model. In some embodiments, the output can be a generated text (e.g., a summary of a given input text, a text generated based on an input prompt, etc.). In some embodiments, the output can be a generated image (e.g., an image generated based on an input text prompt, an image generated based on an input image, etc.).

After the cloud function is registered with cloud function controller 102, cloud function subsystem 106 can add one or more worker deployment requests associated with the cloud function to one or more deployment queues 108. The worker deployment requests can be generated based on properties of the cloud function. For example, the worker deployment requests can include the code to be executed by the worker associated with the cloud function, the minimum number of workers to be deployed, and the like. Cloud function subsystem 106 can add the generated worker deployment requests to deployment queues 108 based on the GPU requirements of the cloud function associated with the worker deployment requests. For example, worker deployment requests for a cloud function that needs to be executed on an Nvidia A100 graphics processing unit should only be put in a deployment queue 108 with an associated agent/ cluster that has an Nvidia A100 graphics processing unit available. As the worker deployment requests are added to deployment queues 108, agents within cluster environments 116 can obtain requests from the queue and can instantiate workers based on the worker deployment request.

Database 118 can include a persistent storage capable of storing cluster information, cloud function information, worker information, machine learning models and/or machine learning model parameters, container environments and/or container environment parameters, executable code, cloud function inputs, cloud function outputs, and/or the like. Database 118 can be hosted by one or more storage devices, such as main memory, magnetic or optical storage disks, tapes, or hard drives, network-attached storage (NAS), storage area network (SAN), and so forth. Although depicted as separate from cloud function controller 102, in at least some embodiments, database 118 can be a part of cloud function controller 102. In at least some embodiments, database 118 can include a network-attached file server, while in other embodiments, database 118 can include some other type of persistent storage such as an object-oriented database, a relational database, a vector database, an in-memory database, and so forth, that may be hosted by a server machine or one or more different machines coupled to cloud function controller 102 via network 114.

In some embodiments, when a cloud function is registered with cloud function subsystem 106, one or more machine learning models associated with the cloud function can be added to database 118. In some embodiments, before or after storing the one or more machine learning models in database 118, the machine learning models can be optimized (e.g., by cloud function controller 102). Optimizing the machine learning models can include quantizing the weights of the machine learning model so the model requires less storage space.

User device 120 can include a desktop computer, a laptop computer, a smartphone, a tablet computer, a server, a wearable device, a virtual reality (VR)/augmented reality (AR)/mixed reality (MR) headset or heads up display, a digital avatar or chat bot kiosk (e.g., a talking kiosk), an in-vehicle infotainment computing device, and/or any suitable computing device capable of performing the techniques described herein. User device 120 can interact with cloud function controller 102 (e.g., via network 114) and may provide a cloud function execution request to cloud function controller 102. For example, a user can submit a machine learning model inference task to cloud function controller 102 to be executed by a cloud function previously registered by the user. The cloud function execution request can include a cloud function identifier and an input to provide to the cloud function (e.g., an input to provide to the machine learning model associated with the cloud function). Cloud function controller 102 can provide the cloud function output to user device 120 after it has been generated (e.g., by a worker in a cluster environment).

Figure 2:
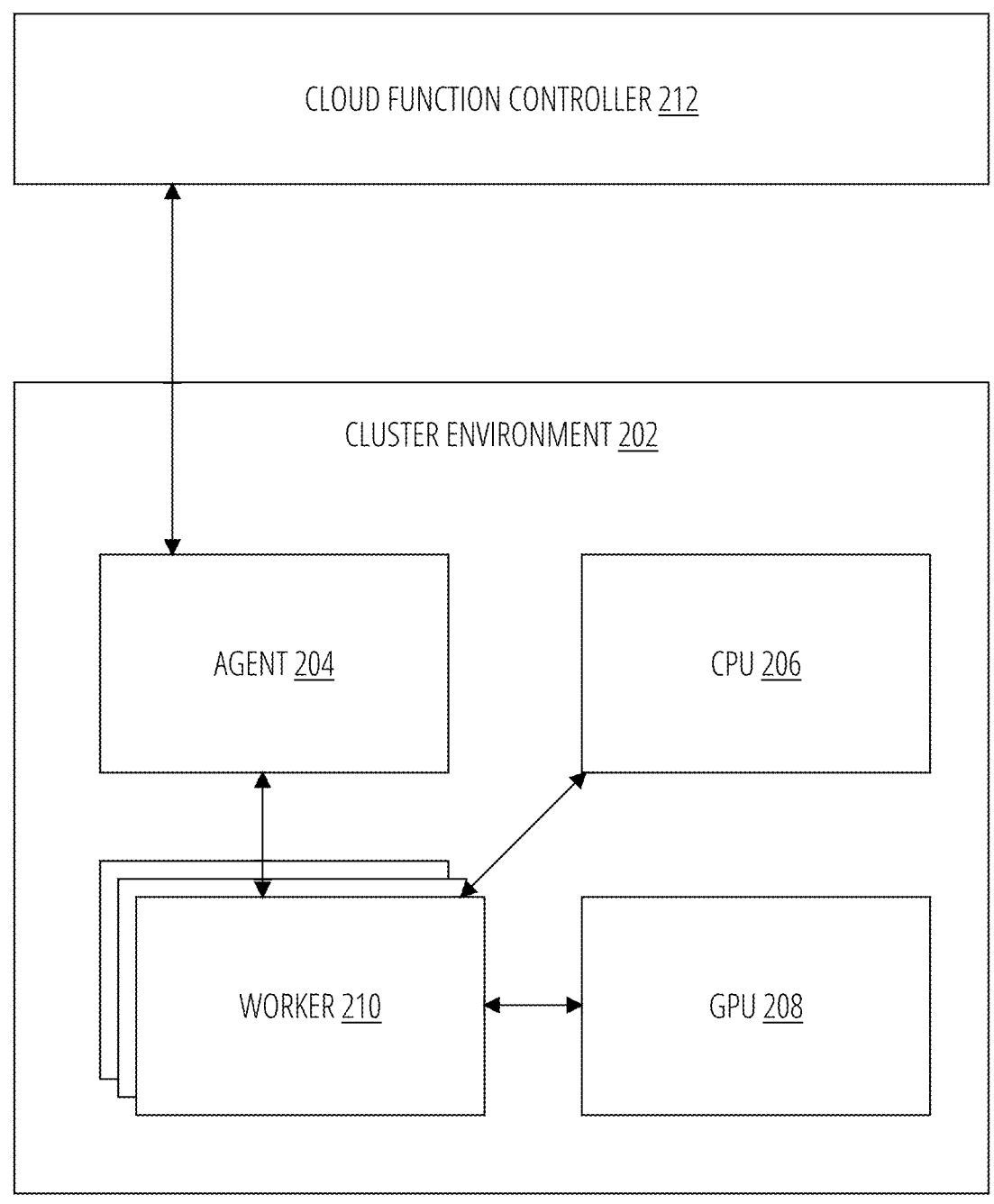
FIG. 2 is a block diagram of an example cluster environment for executing code using graphics processing units in a serverless architecture, according to at least one embodiment.

FIG. 2 is a block diagram of an example cluster environment 202 for executing code using graphics processing units in a serverless architecture, according to at least one embodiment. Cluster environment 202 can include agent 204, one or more central processing units (CPUs) 206, one or more GPUs 208, and one or more workers 210. As discussed above, agent 204 can register cluster environment 202 with cloud function controller 212. In some embodiments, cloud function controller 212 is the same as cloud function controller 102 of FIG. 1. When agent 204 registers cluster environment 202 with cloud function controller 212, agent 204 may inform cloud function controller 212 of the computing capabilities of cluster environment 202. For example, agent 204 may inform cloud function controller 212 of one or more properties of GPUs 208 (e.g., number of GPUs, types of GPUs, amount of video memory available in each GPU, etc.).

Agent 204 can be associated with a deployment queue of cloud function controller 212. As worker deployment requests are added to the deployment queue, agent 204 can obtain requests from the queue and deploy a worker (e.g., worker 210) within cluster environment 202 based on properties of the worker deployment request. Workers 210 of cluster environment 202 can use CPUs 206 and GPUs 208 of cluster environment 202 to execute code. In some embodiments, the code can require GPU resources (e.g., one or more GPU cores, GPU memory, etc.) for execution and/or can be designed to be executed efficiently using GPU resources (e.g., by taking advantage of parallel computing available using GPUs).

In some embodiments, cluster environment 202 can be used for compute tasks independent of workers 210. For example, an entity can register their cluster of computing resources (e.g., cluster environment 202) with cloud function controller 212 (e.g., via agent 204 deployed in the cluster) and can continue to use the cluster for various tasks, in addition to the tasks executed by workers 210 that are deployed by agent 204. If agent 204 determines that cluster environment 202 does not have the bandwidth necessary to continue executing requests from cloud function controller 212 (e.g., if a higher priority workload arrives to the cluster and the cluster utilization reaches a certain threshold), agent 204 can kill one or more workers 210 (e.g., a lower priority worker process) and notify cloud function controller 212. After receiving an indication that the worker is unavailable, cloud function controller 212 can put a new worker deployment request in a deployment queue. An agent of another cluster environment can obtain the worker deployment request from the deployment queue and can spawn a new worker in a new cluster environment to maintain the minimum number of workers requested for a particular cloud function and/or the minimum number of workers required to process incoming requests. In some embodiments, the new worker will be deployed in a cluster associated with a different cloud service provider than the cloud service provider of the first cluster. In some embodiments, the first worker is deployed in a private data center environment and the second worker (e.g., the new worker) is deployed in a cloud service provider environment.

Figure 3:
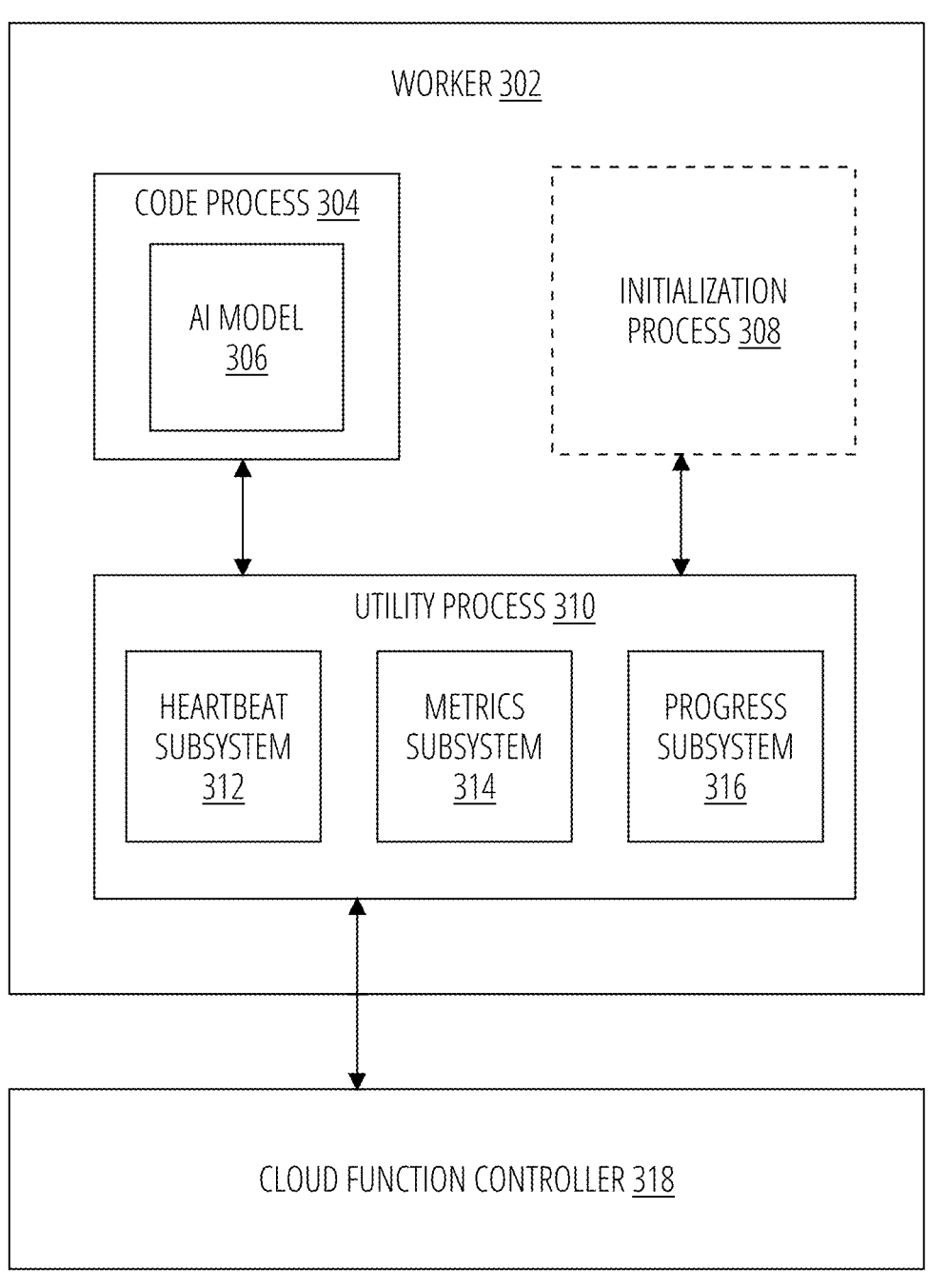
FIG. 3 is a block diagram of an example cloud function worker for executing code using graphics processing units in a serverless architecture, according to at least one embodiment.

FIG. 3 is a block diagram of an example cloud function worker 302 for executing code using graphics processing units in a serverless architecture, according to at least one embodiment. Worker 302 can be deployed in a cluster environment (e.g., cluster environment 116 of FIG. 1, cluster environment 202 of FIG. 2, etc.) by an agent (e.g., agent 204 of FIG. 2) and are responsible for executing cloud functions using the computing resources of their corresponding cluster environment (e.g., CPUs 206 and/or GPUs 208 of FIG. 2). Worker 302 can include multiple processes, such as code process 304 and utility process 310. In some embodiments, worker 302 can include initialization process 308. Initialization process 308 can perform operations necessary to prepare worker 302 to execute its associated cloud function. For example, initialization process 308 can download artificial intelligence (AI) model(s) 306 (e.g., from database 118 of FIG. 1) that will be used by code process 304 during execution of the cloud function. In some embodiments, initialization process 308 can load AI model 306 into memory (e.g., GPU memory). In some embodiments, initialization process 308 can download assets (e.g., images, text, etc.) that are required by code process 304. For example, a cloud function execution request can include an input asset identifier (instead of including the input asset directly in the cloud function execution request), and initialization process 308 can download the input asset based on the identifier.

Utility process 310 can interact with cloud function controller 318 by receiving cloud function execution requests and by returning cloud function execution results. For example, utility process 310 can connect to cloud function controller 318 and can obtain execution requests from a request queue associated with the worker (e.g., off a request queue associated with the cloud function the worker is configured to execute). Utility process 310 can provide the input from the execution request to code process 304 for execution. When code process 304 finishes execution, utility process 310 can take the execution result from code process 304 and provide it to cloud function controller 318 (e.g., by putting it in a cloud function result queue). Utility process 310 can be the only process that can interact with code process 304, increasing security of code process 304. Put another way, in some embodiments, access to code process 304 can be limited to utility process 310.

Code process 304 can execute the cloud function execution request received from utility process 310. The cloud function execution request can include input data (or an identifier (e.g., uniform resource locator (URL)) that can be used to access the input data) and one or more AI model identifiers. In some embodiments, the input data is a text prompt to be provided to an AI model. In some embodiments, the input data is an image to be provided to an AI model. In some embodiments, the input data (e.g., text, image, audio, etc.) is too large to include in the cloud function execution request. In such a case, the input data can be uploaded to a storage server and an identifier associated with the input data (e.g., a URL for accessing the data) can be included in the cloud function execution request.

Prior to execution of the cloud function execution request by code process 304, initialization process 308 may have downloaded and/or loaded into memory the AI model(s) corresponding to the AI model identifier(s) of the execution request.

In some embodiments, the cloud function execution request may include a virtualized execution environment (e.g., container) identifier and/or an identifier of a plurality of virtualized execution environments. Initialization process 308 can download the virtualized execution environment(s) (e.g., container image(s)) based on their identifier(s), and code process 304 can execute the virtualized execution environment and/or the plurality of virtualized execution environments.

Code process 304 can include an AI inference server that will apply AI models 306 to the input data of the cloud function execution request. AI models 306 can include one or more artificial intelligence models capable of generating an output based on a given input. In some embodiments, AI models 306 can refer to a model artifact that is created by a training engine using a training set that includes data inputs and corresponding target outputs. In some embodiments, AI models 306 can include more than one machine learning models. AI models 306 can use one or more of Gaussian Process Regression (GPR), Gaussian Process Classification (GPC), Bayesian Neural Networks, Neural Network Gaussian Processes, Deep Belief Network, Gaussian Mixture Model, or other Probabilistic Learning methods. Non-probabilistic methods can also be used including one or more of Support Vector Machine (SVM), Radial Basis Function (RBF), clustering, Nearest Neighbor algorithm (k-NN), linear regression, random forest, neural network (e.g., artificial neural network, convolutional neural network, Siamese networks, etc.), autoencoders, Transformer models, graph neural networks (GNN), etc. In some embodiments, AI model 306 is a multi-variate analysis (MVA) regression model. In some embodiments, AI model 306 can be a generative AI model which generates new output (e.g., text, images, audio, etc.) depending on the input data provided. In some embodiments, AI models 306 can include one or more generative adversarial networks (GANs), style transfer algorithms, U-Nets, segmentation models, reinforcement learning, capsule networks, gaussian mixture models, Bayesian neural networks, deep belief networks, and/or the like.

In some embodiments, the input data can be a text prompt for a generative AI model (e.g., a large language model (LLM), an image generation model, etc.). Code process 304 can provide the text prompt to AI models 306 that has been loaded into memory to obtain the generative AI output (e.g., the generated natural language response, the generated image, etc.). The output can be provided to utility process 310, which can provide the result to cloud function controller 318. In some embodiments, if the size of the output (e.g., output text, output image, etc.) satisfies a size criterion (e.g., exceeds a size threshold), the output may be provided to a storage device (e.g., database 118 of FIG. 1), and an identifier (e.g., URL) that can be used to access the output may be provided to cloud function controller 318 instead of the output itself. In some embodiments, the output (or an identifier thereof) is stored in a result queue of cloud function controller 318 corresponding to the cloud function that worker 302 is configured to execute. Cloud function controller 318 can obtain the result out of the result queue and cause it to be provided to the requesting user (e.g., user device 120 of FIG. 1).

In some embodiments, utility process 310 includes heartbeat subsystem 312, metrics subsystem 314, and/or progress subsystem 316. Heartbeat subsystem 312 can send periodic heartbeat requests to cloud function controller 318 to indicate that the code process 304 is still executing a cloud function execution request. For example, a cloud function execution request may require a large amount of execution time (e.g., minutes, hours, days, etc.) to complete. By sending periodic heartbeat requests, heartbeat subsystem 312 can inform cloud function controller 318 that code process 304 is still working and has not crashed.

Metrics subsystem 314 can collect metrics from code process 304. For example, metrics subsystem 314 can monitor metrics including utilization of the computing resources of the cluster environment that is hosting worker 302. For example, metrics subsystem 314 can monitor CPU utilization, GPU utilization, memory consumption, storage availability, network bandwidth, and/or the like.

If, based on the collected metrics, code process 304 has additional bandwidth for execution, utility process 310 can obtain an additional cloud function execution request from the request queue in cloud function controller 318 and provide the additional execution request to code process 304 for execution in parallel with (e.g., concurrent with) the already executing request. For example, a first instance of the code associated with the cloud function can be used to process input data of a first cloud function execution request and a second instance of the code can be used to concurrently process input data of a second cloud function execution request. In some embodiments, the result of the first cloud function execution request will be provided to cloud function controller 318 (via utility process 310) before the result of the second cloud function execution request. In some embodiments, the result of the second cloud function execution request will be provided to cloud function controller 318 before the result of the first cloud function execution request.

Progress subsystem 316 can identify progress artifacts created by code process 304 and can provide the progress artifacts to cloud function controller 318 (which can in turn cause them to be provided to the requesting user). Progress artifacts can include files (e.g., text, images, audio, etc.) that indicate a progress of the code process. In some embodiments, progress artifacts can include intermediate results generated by the code process.

Code process 304 can generate one or more progress artifacts indicating a progress of the code execution task (e.g., AI inference task, AI training task, etc.). For example, if code process 304 is generating an image from a text input, code process 304 might produce one or more intermediate results that can be provided to the user while waiting for the final result. Code process 304 can create the progress artifact (e.g., intermediate image), progress subsystem 316 can detect that the progress artifact has been created (e.g., by monitoring a directory of a filesystem), and then utility process 310 can send the progress artifact (or an identifier thereof) to cloud function controller 318.

Thus, a cloud function controller (e.g., cloud function controller 102 of FIG. 1, cloud function controller 212 of FIG. 2, cloud function controller 318 of FIG. 3) can be responsible for managing the cloud function execution requests that are to be executed, the agents that deploy workers, and the workers that execute the cloud function requests. As the cloud function controller receives execution requests, each request can be assigned to a queue, thus converting each execution request from a synchronous request from a user into an asynchronous request to be executed by a worker. The execution request can be assigned to a queue corresponding to the requested cloud function. As a result of queuing execution requests as they are received by the cloud function controller, workers can be protected from being overwhelmed with requests.

Workers (e.g., workers 210, worker 302, etc.) can be responsible for executing requests received by the cloud function controller. Workers can be deployed in computing environments controlled by cloud service providers, in data centers, and/or in private computing environments. Each worker can register with the cloud function controller, thus establishing communication with the cloud function controller without needing to open firewall ports or worry about other network ingress problems (e.g., TLS certificates, DNS records, rate-limiting, etc.). Upon registering with the cloud function controller, the worker can be assigned to a particular cloud function queue. If there are execution requests in the queue waiting to be executed, the worker can obtain a request from the queue to begin execution. In some embodiments, if the worker has available bandwidth (e.g., if the computing resources of cluster environment of the worker are not fully saturated), one or more additional execution requests can be obtained from the queue and executed by the worker in parallel. After execution, the worker can return a result to the cloud function controller. In some embodiments, the result is placed in a queue designated for holding execution results (separate from the queues for execution requests). The cloud function controller can obtain results from the results queue and return the results to the respective users that submitted the cloud function execution request corresponding to each result.

Figure 5:
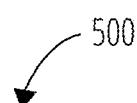
FIG. 5 is a flow diagram of an example method for managing an additional cluster environment, according to at least one embodiment.

FIG. 4 is a flow diagram of an example method 400 for managing a plurality of queues for a plurality of workers in a plurality of cluster environments, according to at least one embodiment. FIG. 5 is a flow diagram of an example method 500 for managing an additional cluster environment, according to at least one embodiment. FIG. 6 is a flow diagram of an example method 600 for generating an execution result, according to at least one embodiment. FIG. 7 is a flow diagram of an example method 700 for deploying workers implemented using multiple cluster environments, according to at least one embodiment. FIG. 8 is a flow diagram of an example method 800 for concurrently executing requests, according to at least one embodiment.

Methods 400, 500, 600, 700, and/or 800 can be performed using one or more processing units (e.g., CPUs, GPUs, accelerators, physics processing units (PPUs), data processing units (DPUs), etc.), which may include (or communicate with) one or more memory devices. In at least one embodiment, methods 400, 500, 600, 700, and/or 800 can be performed using a processing device or processing devices. In at least one embodiment, methods 400, 500, and/or 700 can be performed using processing units of cloud function controller 102 of FIG. 1. In at least one embodiments, methods 600 and/or 800 can be performed by worker 210 of FIG. 2 and/or worker 302 of FIG. 3. In at least one embodiment, processing units performing any of methods 400, 500, 600, 700, and/or 800 can be executing instructions stored on a non-transient computer readable storage media. In at least one embodiments, any of methods 400, 500, 600, 700, and/or 800 can be performed using multiple processing threads (e.g., CPU threads and/or GPU threads), individual threads executing one or more individual functions, routines, subroutines, or operations of the method. In at least one embodiment, processing threads implementing any of methods 400, 500, 600, 700, and/or 800 can be synchronized (e.g., using semaphores, critical sections, and/or other thread synchronization mechanisms). Alternatively, processing threads implementing any of methods 400, 500, 600, 700, and/or 800 can be executed asynchronously with respect to each other. Various operations of methods 400, 500, 600, 700, and/or 800 can be performed in a different order compared with the order shown in FIG. 4, FIG. 5, FIG. 6, FIG. 7, and/or FIG. 8. Some operations of any of methods 400, 500, 600, 700, and/or 800 can be performed concurrently with other operations. In at least one embodiment, one or more operations shown in FIG. 4, FIG. 5, FIG. 6, FIG. 7, and/or FIG. 8 may not always be performed.

FIG. 4 is a flow diagram of an example method 400 for managing a plurality of queues for a plurality of workers implemented using a plurality of cluster environments, according to at least one embodiment. At block 402, processing units executing method 400 may maintain, using a controller (e.g., cloud function controller 102 of FIG. 1), a plurality of queues (e.g., cloud function queues) for a plurality of workers implemented using a plurality of cluster environments. Each cluster environment can host an agent that communicates with the controller and have graphics processing unit (GPU) resources accessible to at least a subset of the plurality of workers. At block 404, processing units may store a first execution request of an entity in a first queue of the plurality of queues. The first execution request of the entity can be associated with a first cloud function. The first queue of the plurality of queues can be associated with the first cloud function. In some embodiments, the first execution request includes input data and at least one of an AI model identifier, a virtualized execution environment identifier, or an identifier of a plurality of virtualized execution environments.

At block 406, processing units may receive, from a first worker of the plurality of workers implemented using a first cluster environment of the plurality of cluster environments, a first execution result corresponding to the first execution request of the entity. At block 408, processing units may cause the first execution result to be provided to the entity.

In some embodiments, processing units executing method 400 may further receive a second execution request, store the second execution request in the first queue of the plurality of queues, and receive a second execution result corresponding to the second execution request from the first worker of the plurality of workers implemented using the first cluster environment of the plurality of cluster environments.

In some embodiments, processing units executing method 400 may further receive a second execution request, store the second execution request in the first queue of the plurality of queues, and receive a second execution result corresponding to the second execution request from a second worker of the plurality of workers. In some embodiments, the second worker of the plurality of workers is implemented using a second cluster environment of the plurality of cluster environments.

In some embodiments, processing units may further receive periodic heartbeat requests from the first worker of the plurality of workers implemented using the first cluster environment of the plurality of cluster environments. In some embodiments, processing units may further receive a progress indicator artifact from the first worker of the plurality of workers implemented using the first cluster environment of the plurality of cluster environments.

FIG. 5 is a flow diagram of an example method 500 for managing an additional cluster environment, according to at least one embodiment. In some embodiments, method 500 can be performed prior to block 404 of method 400. At block 502, processing units executing method 500 may receive a cluster registration from a first agent hosted by the first cluster environment. The cluster registration can indicate one or more characteristics of GPU resources of the first cluster environment. The characteristics of the GPU resources can include the type of GPU, the number of processing cores in the GPU, the amount of GPU memory available, and/or the like. At block 504, processing units may generate a worker deployment request for execution by the first agent to deploy the first worker using the first cluster environment.

In some embodiments, processing units may further receive a worker registration from the first worker implemented using the first cluster environment and associate the first worker with the first queue of the plurality of queues.

FIG. 6 is a flow diagram of an example method 600 for generating an execution result, according to at least one embodiment. At block 602, processing units executing method 600 may receive, using a worker (e.g., a cloud function worker), an execution request from a queue of a controller (e.g., cloud function controller). At block 604, processing units may identify a first artificial intelligence (AI) model of a plurality of AI models of the controller. At block 606, processing units may generate an execution result corresponding to the execution request using the first AI model and at least a graphics processing unit of a cluster environment hosting the worker. At block 608, processing units may cause the execution result to be transmitted to the controller. In some embodiments, to cause the execution result to be transmitted to the controller, processing units may cause the execution result to be transmitted to a storage device and may cause a storage identifier associated with the execution result to be transmitted to the controller.

In some embodiments, the worker includes a code process and a utility process. In some embodiments, access to the code process is limited to the utility process. In some embodiments, the worker includes an initialization process to download the first AI model prior to generating the execution result. In some embodiments, the execution request includes an asset identifier, and the initialization process is to download an input asset associated with the asset identifier.

In some embodiments, the utility process transmits periodic heartbeat requests to the controller.

In some embodiments, processing units executing method 600 may further generate a progress indicator artifact and cause the progress indicator artifact to be transmitted to the controller. In some embodiments, the worker is deployed by an agent associated with the cluster environment. The agent may communicate with the controller. In some embodiments, the worker is deployed based on a worker deployment request received by the agent from the controller.

FIG. 7 is a flow diagram of an example method 700 for deploying workers in multiple cluster environments, according to at least one embodiment. At block 702, processing units executing method 700 may generate, using a controller (e.g., a cloud function controller), a first worker deployment request for a first worker. At block 704, processing units may receive a first registration of the first worker based on the first worker deployment request. The first worker may be deployed in a first cluster environment having graphics processing unit (GPU) resources accessible to the first worker to process execution requests. At block 706, processing units may receive an indication that the first worker is unavailable. At block 708, processing units may generate a second worker deployment request for a second worker. At block 710, processing units may receive a second registration of the second worker based on the second worker deployment request. The second worker may be deployed in a second cluster environment having GPU resources accessible to the second worker to continue processing the execution requests.

In some embodiments, the first cluster environment is provided by a first cloud service provider and the second cluster environment is provided by a second cloud service provider.

In some embodiments, processing units executing method 700 may further receive a first execution result associated with a first execution request of the execution requests. In some embodiments, the first execution result is generated using at least a portion of the GPU resources of the first cluster environment. In some embodiments, processing units may further receive a second execution result from the second worker. In some embodiments, the second execution result can be associated with a second execution request of the execution requests and can be generated using at least a portion of the GPU resources of the second cluster environment.

In some embodiments, the first cluster environment includes a first agent that communicates with the controller, and the second cluster environment includes a second agent that communicates with the controller.

In some embodiments, processing units may further store the first worker deployment request in a worker deployment queue. The worker deployment queue can be associated with the first agent and the second agent. In some embodiments, processing units may further store the second worker deployment request in the worker deployment queue.

FIG. 8 is a flow diagram of an example method 800 for concurrently executing requests, according to at least one embodiment. At block 802, processing units executing method 800 may receive, using a worker, a first execution request from a queue of a controller. At block 804, processing units may execute a first instance of a code based on the first execution request using at least a graphics processing unit (GPU) of a cluster environment hosting the cloud function worker. At block 806, processing units may determine first metrics of the GPU of the cluster environment. At block 808, processing units may, responsive to the first metrics of the GPU satisfying a bandwidth-criterion, request a second execution request from the queue of the controller. In some embodiments, the bandwidth-criterion can include determining whether utilization of the GPU exceeds a bandwidth threshold. For example, if the first metrics of the GPU indicate that the GPU's utilization does not exceed the bandwidth threshold (e.g., 50%, 80%, 90%, 95%, etc.), the worker executing functions (e.g., cloud functions) using the GPU can request another execution request from the controller. At block 810, processing units may execute, at least partially concurrently with execution of the first instance of the code, a second instance of the code based on the second execution request using at least the GPU of the cluster environment.

In some embodiments, processing units executing method 800 may further provide a first execution result corresponding to executing the first instance of the code to the controller and provide a second execution result corresponding to executing the second instance of the code to the controller. In some embodiments, to provide the first execution result corresponding to executing the first instance of the code to the controller, processing units may cause the first execution result to be transmitted to a storage service and may cause a storage identifier associated with the first execution result to be transmitted to the controller.

In some embodiments, the first execution request includes input data. To execute the first instance of the code based on the first execution request, processing units may provide the input data of the first execution request to the first instance of the code.

In some embodiments, the first execution request includes an input data identifier. Processing units may further access an input data associated with the input data identifier from a storage service. To execute the first instance of the code based on the first execution request, processing units may provide the input data associated with the input data identifier to the first instance of the code.

In some embodiments, processing units executing method 800 may further cause periodic heartbeat requests to be transmitted to the controller. In some embodiments, processing units may further generate a progress indicator artifact corresponding to a progress of executing the first instance of the code and may cause the progress indicator artifact to be transmitted to the controller.

Inference and Training Logic

Figure 9A:
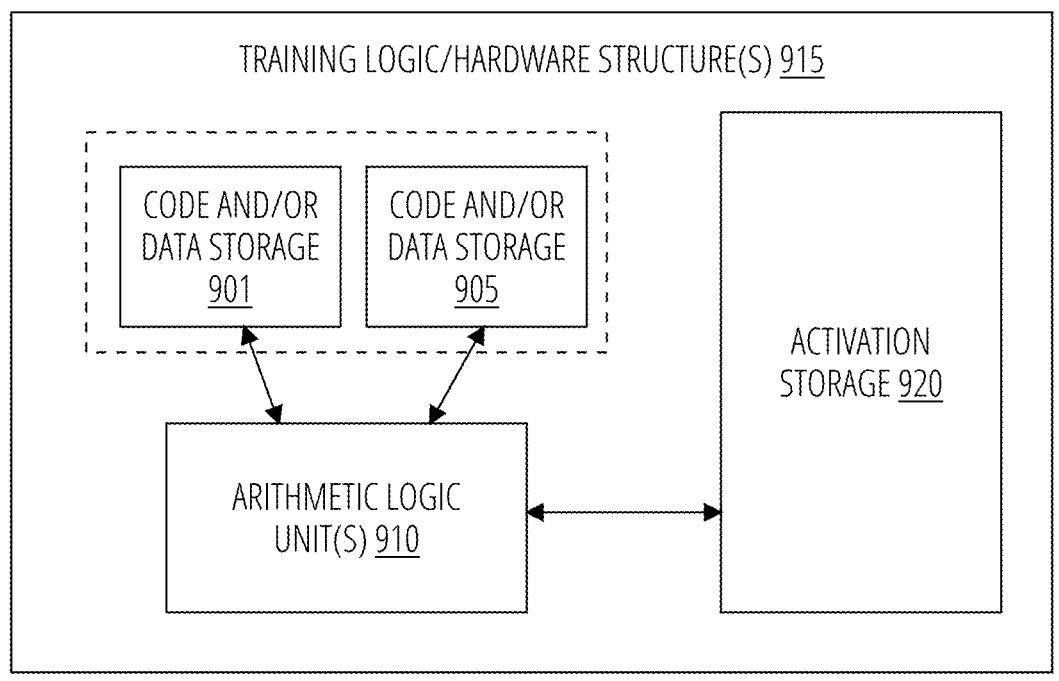
FIG. 9A illustrates inference and/or training logic, according to at least one embodiment of the present disclosure.

FIG. 9A illustrates inference and/or training logic 915 used to perform inferencing and/or training operations associated with one or more embodiments.

In at least one embodiment, inference and/or training logic 915 may include, without limitation, code and/or data storage 901 to store forward and/or output weight and/or input/output data, and/or other parameters to configure neurons or layers of a neural network trained and/or used for inferencing in aspects of one or more embodiments. In at least one embodiment, training logic 915 may include (or be coupled to code and/or data storage 901 that stores) graph code or other software to control timing and/or order, in which weight and/or other parameter information is to be loaded to configure processing units, including logic units, integer and/or floating point units (collectively, arithmetic logic units (ALUs) or simply circuits). In at least one embodiment, code, such as graph code, loads weight or other parameter information into processor ALUs based on an architecture of a neural network to which such code corresponds. In at least one embodiment, code and/or data storage 901 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 901 may be included with other on-chip or off-chip data storage, including a processor's L1, L2, or L3 cache or system memory.

In at least one embodiment, any portion of code and/or data storage 901 may be internal or external to one or more processors or other hardware logic devices or circuits. In at least one embodiment, code and/or data storage 901 may be cache memory, dynamic randomly addressable memory ("DRAM"), static randomly addressable memory ("SRAM"), non-volatile memory (e.g., flash memory), or other storage. In at least one embodiment, a choice of whether code and/or data storage 901 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 915 may include, without limitation, a code and/or data storage 905 to store backward and/or output weight and/or input/output data corresponding to neurons or layers of a neural network trained and/or used for inferencing in aspects of one or more embodiments. In at least one embodiment, code and/or data storage 905 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 915 may include (or be coupled to code and/or data storage 905 that stores) graph code or other software to control timing and/or order, in which weight and/or other parameter information is to be loaded to configure processing units, including logic units, integer and/or floating point units (collectively, arithmetic logic units (ALUs)).

In at least one embodiment, code, such as graph code, causes the loading of weight or other parameter information into processor ALUs based on an architecture of a neural network to which such code corresponds. In at least one embodiment, any portion of code and/or data storage 905 may be included with other on-chip or off-chip data storage, including a processor's L1, L2, or L3 cache or system memory. In at least one embodiment, any portion of code and/or data storage 905 may be internal or external to one or more processors or other hardware logic devices or circuits. In at least one embodiment, code and/or data storage 905 may be cache memory, DRAM, SRAM, non-volatile memory (e.g., flash memory), or other storage. In at least one embodiment, a choice of whether code and/or data storage 905 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or code and/or data storage 901 and code and/or data storage 905 may be separate storage structures. In at least one embodiment, code and/or data storage 901 and code and/or data storage 905 may be a combined storage structure. In at least one embodiment, code and/or data storage 901 and code and/or data storage 905 may be partially combined and partially separate. In at least one embodiment, any portion of code and/or data storage 901 and code and/or data storage 905 may be included with other on-chip or off-chip data storage, including a processor's L1, L2, or L3 cache or system memory.

In at least one embodiment, inference and/or training logic 915 may include, without limitation, one or more arithmetic logic unit(s) ("ALU(s)") 910, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 920 that are functions of input/output and/or weight parameter data stored in code and/or data storage 901 and/or code and/or data storage 905. In at least one embodiment, activations stored in activation storage 920 are generated according to linear algebraic and or matrix-based mathematics performed by ALU(s) 910 in response to performing instructions or other code, wherein weight values stored in code and/or data storage 905 and/or code and/or data storage 901 are used as operands along with other values, such as bias values, gradient information, momentum values, or other parameters or hyperparameters, any or all of which may be stored in code and/or data storage 905 or code and/or code and/or data storage 901 or another storage on or off-chip.

In at least one embodiment, ALU(s) 910 are included within one or more processors or other hardware logic devices or circuits, whereas in another embodiment, ALU(s) 910 may be external to a processor or other hardware logic device or circuit that uses them (e.g., a co-processor). In at least one embodiment, ALU(s) 910 may be included within a processor's execution units or otherwise within a bank of ALUs accessible by a processor's execution units either within the same processor or distributed between different processors of different types (e.g., central processing units, graphics processing units, fixed function units, etc.). In at least one embodiment, code and/or data storage 901, code and/or data storage 905, and activation storage 920 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 920 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 920 may be cache memory, DRAM, SRAM, non-volatile memory (e.g., flash memory), or other storage. In at least one embodiment, activation storage 920 may be completely or partially within or external to one or more processors or other logical circuits. In at least one embodiment, a choice of whether activation storage 920 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 915 illustrated in FIG. 9A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 915 illustrated in FIG. 9A may be used in conjunction with central processing unit ("CPU") hardware, graphics processing unit ("GPU") hardware or other hardware, such as field programmable gate arrays ("FPGAs").

Figure 9B:
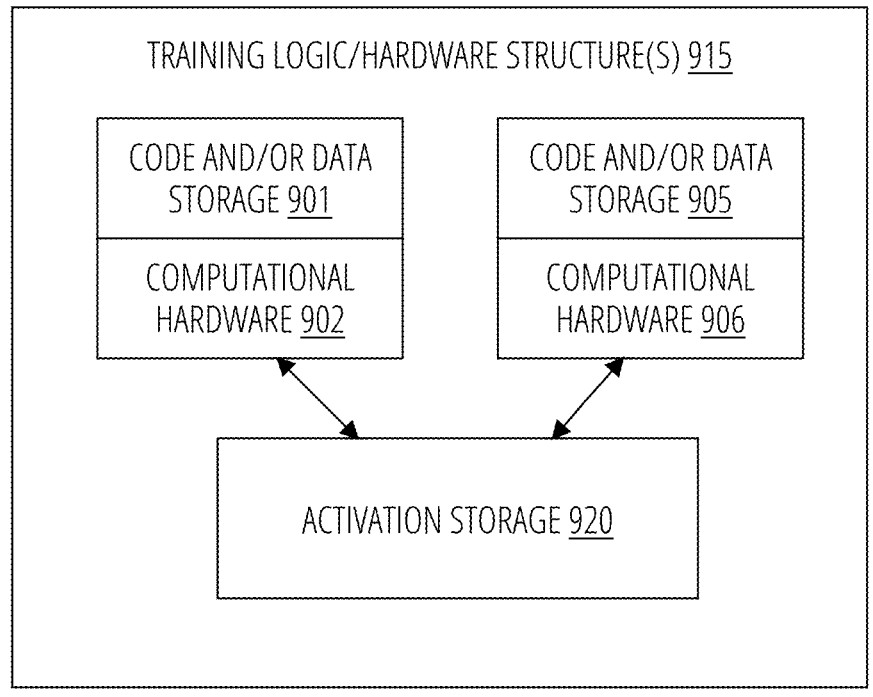
FIG. 9B illustrates inference and/or training logic, according to at least one embodiment.

FIG. 9B illustrates inference and/or training logic 915, according to at least one embodiment. In at least one embodiment, inference and/or training logic 915 may include, without limitation, hardware logic in which computational resources are dedicated or otherwise exclusively used in conjunction with weight values or other information corresponding to one or more layers of neurons within a neural network. In at least one embodiment, inference and/or training logic 915 illustrated in FIG. 9B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 915 illustrated in FIG. 9B may be used in conjunction with central processing unit (CPU) hardware, graphics processing unit (GPU) hardware or other hardware, such as field programmable gate arrays (FPGAs). In at least one embodiment, inference and/or training logic 915 includes, without limitation, code and/or data storage 901 and code and/or data storage 905, which may be used to store code (e.g., graph code), weight values and/or other information, including bias values, gradient information, momentum values, and/or other parameter or hyperparameter information. In at least one embodiment illustrated in FIG. 9B, each of code and/or data storage 901 and code and/or data storage 905 is associated with a dedicated computational resource, such as computational hardware 902 and computational hardware 906, respectively. In at least one embodiment, each of computational hardware 902 and computational hardware 906 comprises one or more ALUs that perform mathematical functions, such as linear algebraic functions, only on information stored in code and/or data storage 901 and code and/or data storage 905, respectively, the result of which is stored in activation storage 920.

In at least one embodiment, each of code and/or data storage 901 and 905 and corresponding computational hardware 902 and 906, respectively, correspond to different layers of a neural network, such that resulting activation from one storage/computational pair 901/902 of code and/or data storage 901 and computational hardware 902 is provided as an input to a next storage/computational pair

905/906 of code and/or data storage 905 and computational hardware 906, in order to mirror a conceptual organization of a neural network. In at least one embodiment, each of storage/computational pairs 901/902 and 905/906 may correspond to more than one neural network layer. In at least one embodiment, additional storage/computation pairs (not shown) subsequent to or in parallel with storage/computation pairs 901/902 and 905/906 may be included in inference and/or training logic 915.

Neural Network Training and Deployment

Figure 10:
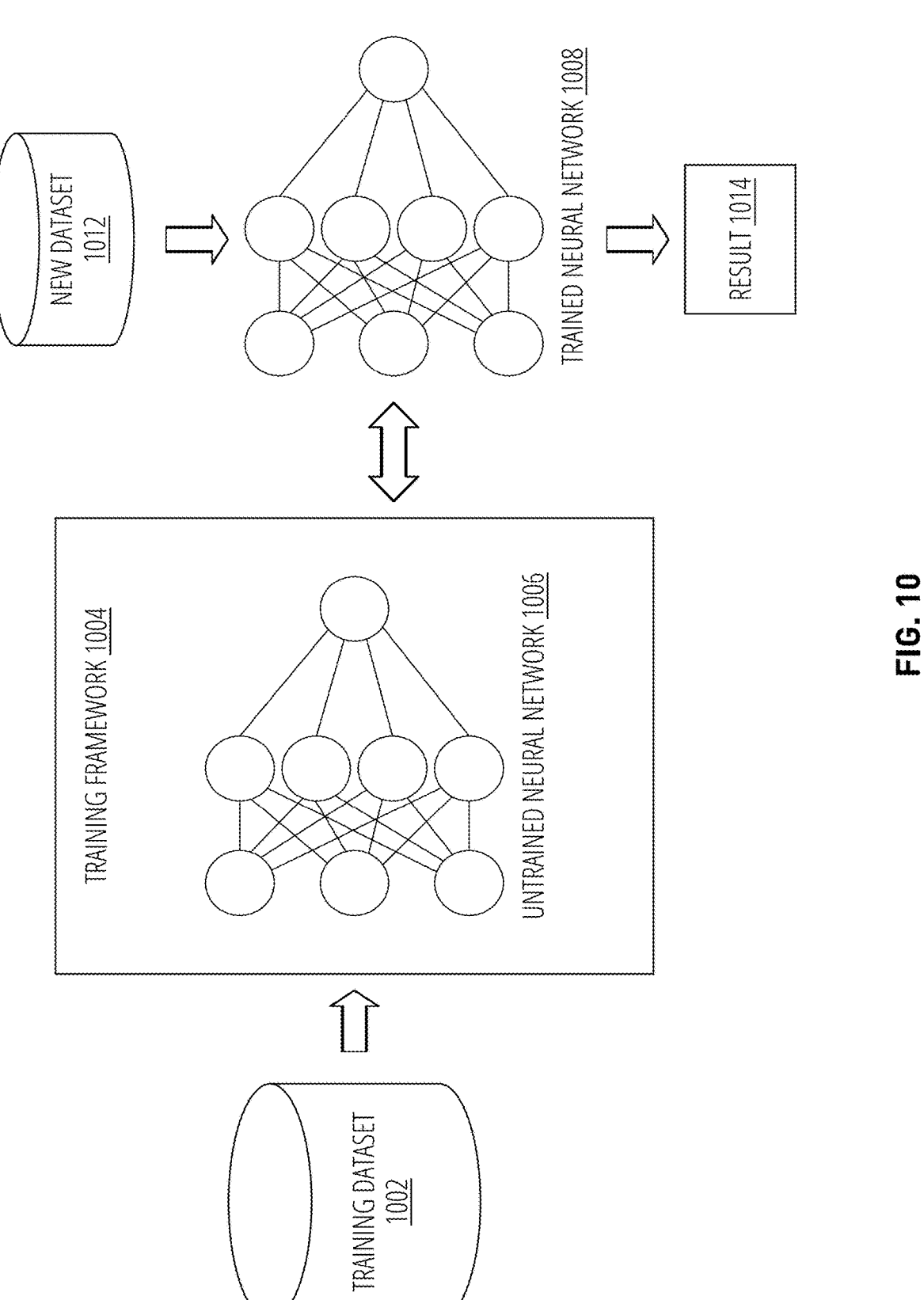
FIG. 10 illustrates training and deployment of a neural network, according to at least one embodiment.

FIG. 10 illustrates training and deployment of a deep neural network, according to at least one embodiment. In at least one embodiment, untrained neural network 1006 is trained using a training dataset 1002. In at least one embodiment, training framework 1004 is a PyTorch framework, whereas in other embodiments, training framework 1004 is a TensorFlow, Boost, Caffe, Microsoft Cognitive Toolkit/ CNTK, MXNet, Chainer, Keras, Deeplearning4j, or other training framework. In at least one embodiment, training framework 1004 trains an untrained neural network 1006 and enables it to be trained using processing resources described herein to generate a trained neural network 1008. In at least one embodiment, weights may be chosen randomly or by pre-training using a deep belief network. In at least one embodiment, training may be performed in either a supervised, partially supervised, or unsupervised manner.

In at least one embodiment, untrained neural network 1006 is trained using supervised learning, wherein training dataset 1002 includes an input paired with a desired output for an input, or where training dataset 1002 includes input having a known output and an output of neural network 1006 is manually graded. In at least one embodiment, untrained neural network 1006 is trained in a supervised manner and processes inputs from training dataset 1002 and compares resulting outputs against a set of expected or desired outputs. In at least one embodiment, errors are then propagated back through untrained neural network 1006. In at least one embodiment, training framework 1004 adjusts weights that control untrained neural network 1006. In at least one embodiment, training framework 1004 includes tools to monitor how well untrained neural network 1006 is converging towards a model, such as trained neural network 1008, suitable to generating correct answers, such as in result 1014, based on input data such as a new dataset 1012. In at least one embodiment, training framework 1004 trains untrained neural network 1006 repeatedly while adjusting weights to refine an output of untrained neural network 1006 using a loss function and adjustment algorithm, such as stochastic gradient descent. In at least one embodiment, training framework 1004 trains untrained neural network 1006 until untrained neural network 1006 achieves a desired accuracy. In at least one embodiment, trained neural network 1008 can then be deployed to implement any number of machine learning operations.

In at least one embodiment, untrained neural network 1006 is trained using unsupervised learning, wherein untrained neural network 1006 attempts to train itself using unlabeled data. In at least one embodiment, unsupervised learning training dataset 1002 will include input data without any associated output data or "ground truth" data. In at least one embodiment, untrained neural network 1006 can learn groupings within training dataset 1002 and can determine how individual inputs are related to untrained dataset 1002. In at least one embodiment, unsupervised training can be used to generate a self-organizing map in trained neural network 1008 capable of performing operations useful in reducing dimensionality of new dataset 1012. In at least one embodiment, unsupervised training can also be used to perform anomaly detection, which allows identification of data points in new dataset 1012 that deviate from normal patterns of new dataset 1012.

In at least one embodiment, semi-supervised learning may be used, which is a technique in which training dataset 1002 includes a mix of labeled and unlabeled data. In at least one embodiment, training framework 1004 may be used to perform incremental learning, such as through transferred learning techniques. In at least one embodiment, incremental learning enables trained neural network 1008 to adapt to new dataset 1012 without forgetting knowledge instilled within trained neural network 1008 during initial training.

Figure 11:
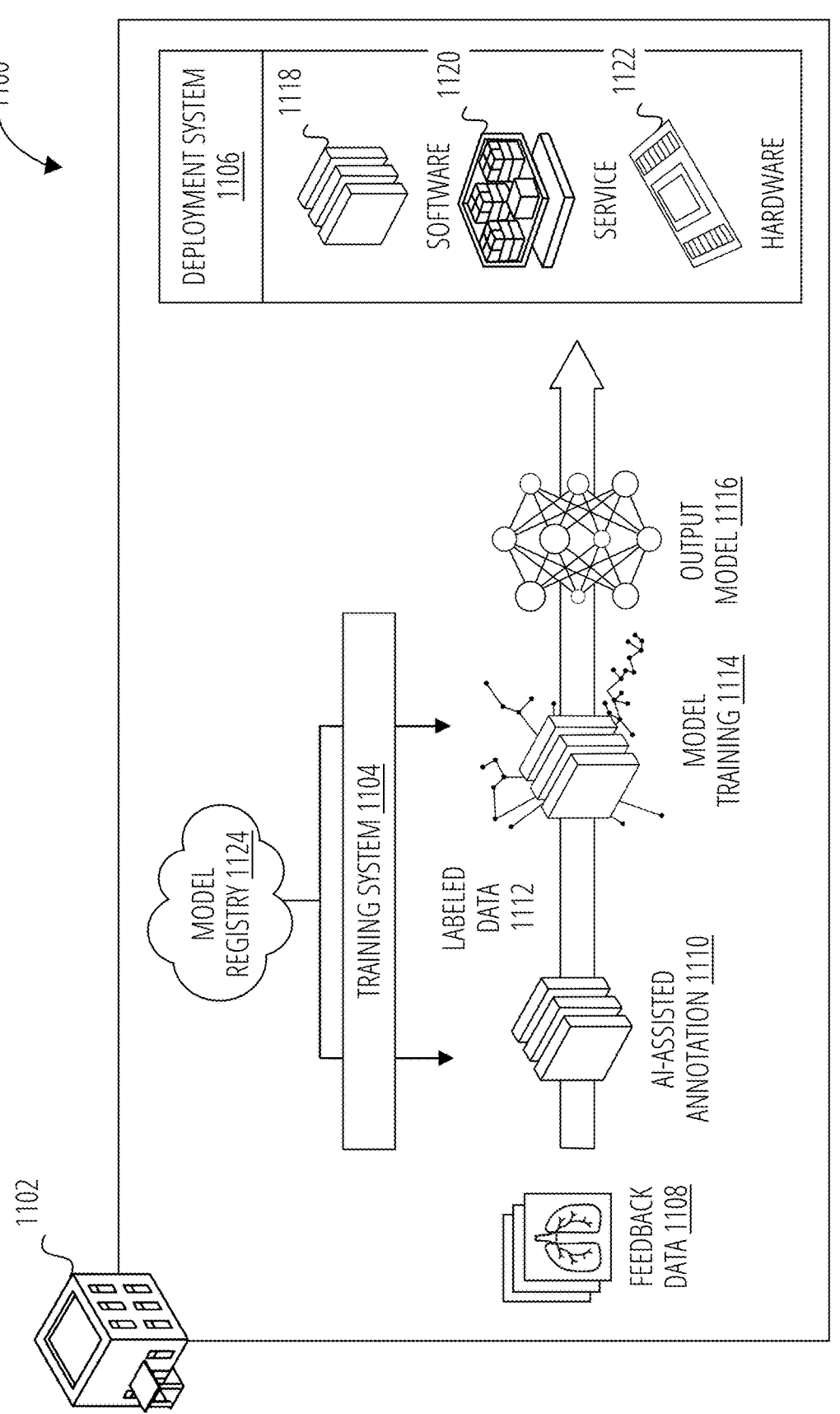
FIG. 11 is an example data flow diagram for an advanced computing pipeline, according to at least one embodiment.

With reference to FIG. 11, FIG. 11 is an example data flow diagram for a process 1100 of generating and deploying a processing and inferencing pipeline, according to at least one embodiment. In at least one embodiment, process 1100 may be deployed to perform game name recognition analysis and inferencing on user feedback data at one or more facilities 1102, such as a data center.

In at least one embodiment, process 1100 may be executed within a training system 1104 and/or a deployment system 1106. In at least one embodiment, training system 1104 may be used to perform training, deployment, and embodiment of machine learning models (e.g., neural networks, object detection algorithms, computer vision algorithms, etc.) for use in deployment system 1106. In at least one embodiment, deployment system 1106 may be configured to offload processing and compute resources among a distributed computing environment to reduce infrastructure requirements at facility 1102. In at least one embodiment, deployment system 1106 may provide a streamlined platform for selecting, customizing, and implementing virtual instruments for use with computing devices at facility 1102. In at least one embodiment, virtual instruments may include software-defined applications for performing one or more processing operations with respect to feedback data. In at least one embodiment, one or more applications in a pipeline may use or call upon services (e.g., inference, visualization, compute, AI, etc.) of deployment system 1106 during execution of applications.

In at least one embodiment, some applications used in advanced processing and inferencing pipelines may use machine learning models or other AI to perform one or more processing steps. In at least one embodiment, machine learning models may be trained at facility 1102 using feedback data 1108 (such as imaging data) stored at facility 1102 or feedback data 1108 from another facility or facilities, or a combination thereof. In at least one embodiment, training system 1104 may be used to provide applications, services, and/or other resources for generating working, deployable machine learning models for deployment system 1106.

In at least one embodiment, a model registry 1124 may be backed by object storage that may support versioning and object metadata. In at least one embodiment, object storage may be accessible through, for example, a cloud storage (e.g., a cloud 1226 of FIG. 12) compatible application programming interface (API) from within a cloud platform. In at least one embodiment, machine learning models within model registry 1124 may be uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline(s) 1204 (FIG. 12) may include a scenario where facility 1102 is training their own machine learning model or has an existing machine learning model that needs to be optimized or updated. In at least one embodiment, feedback data 1108 may be received from various channels, such as forums, web forms, or the like. In at least one embodiment, once feedback data 1108 is received, AI-assisted annotation 1110 may be used to aid in generating annotations corresponding to feedback data 1108 to be used as ground truth data for a machine learning model. In at least one embodiment, AI-assisted annotation 1110 may include one or more machine learning models (e.g., convolutional neural networks (CNNs)) that may be trained to generate annotations corresponding to certain types of feedback data 1108 (e.g., from certain devices) and/or certain types of anomalies in feedback data 1108. In at least one embodiment, AI-assisted annotations 1110 may then be used directly, or may be adjusted or fine-tuned using an annotation tool, to generate ground truth data. In at least one embodiment, in some examples, labeled data 1112 may be used as ground truth data for training a machine learning model. In at least one embodiment, AI-assisted annotations 1110, labeled data 1112, or a combination thereof may be used as ground truth data for training a machine learning model, e.g., via model training 1114 in FIG. 11 and/or FIG. 12. In at least one embodiment, a trained machine learning model may be referred to as an output model 1116, and may be used by deployment system 1106, as described herein.

In at least one embodiment, training pipeline(s) 1204 (FIG. 12) may include a scenario where facility 1102 needs a machine learning model for use in performing one or more processing tasks for one or more applications in deployment system 1106, but facility 1102 may not currently have such a machine learning model (or may not have a model that is optimized, efficient, or effective for such purposes). In at least one embodiment, an existing machine learning model may be selected from model registry 1124. In at least one embodiment, model registry 1124 may include machine learning models trained to perform a variety of different inference tasks on imaging data. In at least one embodiment, machine learning models in model registry 1124 may have been trained on imaging data from different facilities than facility 1102 (e.g., facilities that are remotely located). In at least one embodiment, machine learning models may have been trained on imaging data from one location, two locations, or any number of locations. In at least one embodiment, when being trained on imaging data, which may be a form of feedback data 1108, from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 1124. In at least one embodiment, a machine learning model may then be retrained, or updated, at any number of other facilities, and a retrained or updated model may be made available in model registry 1124. In at least one embodiment, a machine learning model may then be selected from model registry 1124—and referred to as output model(s) 1116—and may be used in deployment system 1106 to perform one or more processing tasks for one or more applications of a deployment system.

In at least one embodiment, training pipeline(s) 1204 (FIG. 12) may be used in a scenario that includes facility 1102 requiring a machine learning model for use in performing one or more processing tasks for one or more applications in deployment system 1106, but facility 1102 may not currently have such a machine learning model (or may not have a model that is optimized, efficient, or effective for such purposes). In at least one embodiment, a machine learning model selected from model registry 1124 might not be fine-tuned or optimized for feedback data 1108 generated at facility 1102 because of differences in populations, genetic variations, robustness of training data used to train a machine learning model, diversity in anomalies of training data, and/or other issues with training data. In at least one embodiment, AI-assisted annotation 1110 may be used to aid in generating annotations corresponding to feedback data 1108 to be used as ground truth data for retraining or updating a machine learning model. In at least one embodiment, labeled data 1112 may be used as ground truth data for training a machine learning model. In at least one embodiment, retraining or updating a machine learning model may be referred to as model training 1114. In at least one embodiment, model training 1114 may include data—e.g., AI-assisted annotations 1110, labeled data 1112, or a combination thereof—that may be used as ground truth data for retraining or updating a machine learning model.

In at least one embodiment, deployment system 1106 may include software 1118, service 1120, hardware 1122, and/or other components, features, and functionality. In at least one embodiment, deployment system 1106 may include a software "stack," such that software 1118 may be built on top of service 1120 and may use service 1120 to perform some or all of processing tasks, and service 1120 and software 1118 may be built on top of hardware 1122 and use hardware 1122 to execute processing, storage, and/or other compute tasks of deployment system 1106.

In at least one embodiment, software 1118 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of computing device there may be any number of containers that may perform a data processing task with respect to feedback data 1108 (or other data types, such as those described herein). In at least one embodiment, an advanced processing and inferencing pipeline may be defined based on selections of different containers that are desired or required for processing feedback data 1108, in addition to containers that receive and configure imaging data for use by each container and/or for use by facility 1102 after processing through a pipeline (e.g., to convert outputs back to a usable data type for storage and display at facility 1102). In at least one embodiment, a combination of containers within software 1118 (e.g., that make up a pipeline) may be referred to as a virtual instrument (as described in more detail herein), and a virtual instrument may leverage service 1120 and hardware 1122 to execute some or all processing tasks of applications instantiated in containers.

In at least one embodiment, data may undergo preprocessing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output model(s) 1116 of training system 1104.

In at least one embodiment, tasks of data processing pipeline may be encapsulated in one or more container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1124 and associated with one or more applications. In at least one embodiment, images of applications (e.g., container images) may be available in a container registry, and once selected by a user from a container registry for deployment in a pipeline, an image may be used to generate a container for an instantiation of an application for use by a user system.

In at least one embodiment, developers may develop, publish, and store applications (e.g., as containers) for performing processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1120 as a system (e.g., system 1200 of FIG. 12). In at least one embodiment, once validated by system 1200 (e.g., for accuracy, etc.), an application may be available in a container registry for selection and/or embodiment by a user (e.g., a hospital, clinic, lab, healthcare provider, etc.) to perform one or more processing tasks with respect to data at a facility (e.g., a second facility) of a user.

Figure 12:
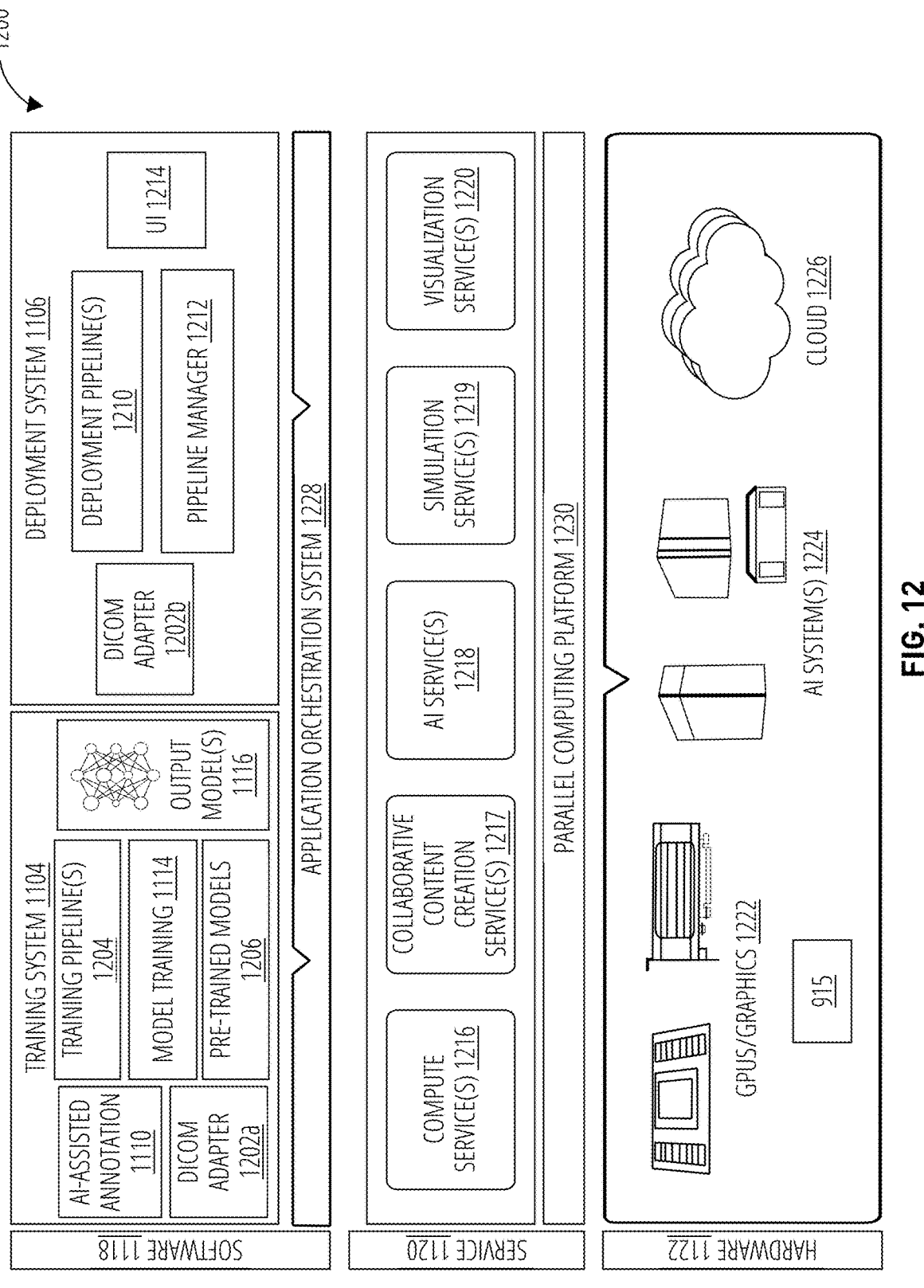
FIG. 12 is a system diagram for an example system for training, adapting, instantiating and deploying machine learning models in an advanced computing pipeline, according to at least one embodiment.

In at least one embodiment, developers may then share applications or containers through a network for access and use by users of a system (e.g., system 1200 of FIG. 12). In at least one embodiment, completed and validated applications or containers may be stored in a container registry and associated machine learning models may be stored in model registry 1124. In at least one embodiment, a requesting entity that provides an inference or image processing request may browse a container registry and/or model registry 1124 for an application, container, dataset, machine learning model, etc., select a desired combination of elements for inclusion in data processing pipeline, and submit a processing request. In at least one embodiment, a request may include input data that is necessary to perform a request, and/or may include a selection of application(s) and/or machine learning models to be executed in processing a request. In at least one embodiment, a request may then be passed to one or more components of deployment system 1106 (e.g., a cloud) to perform processing of a data processing pipeline. In at least one embodiment, processing by deployment system 1106 may include referencing selected elements (e.g., applications, containers, models, etc.) from a container registry and/or model registry 1124. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, service 1120 may be leveraged. In at least one embodiment, service 1120 may include compute services, collaborative content creation services, simulation services, artificial intelligence (AI) services, visualization services, and/or other service types. In at least one embodiment, service 1120 may provide functionality that is common to one or more applications in software 1118, so functionality may be abstracted to a service that may be called upon or leveraged by applications. In at least one embodiment, functionality provided by service 1120 may run dynamically and more efficiently, while also scaling well by allowing applications to process data in parallel, e.g., using a parallel computing platform 1230 (FIG. 12). In at least one embodiment, rather than each application that shares a same functionality offered by a service 1120 being required to have a respective instance of service 1120, service 1120 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities.

In at least one embodiment, where a service 1120 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more processing operations associated with segmentation tasks. In at least one embodiment, software 1118 implementing advanced processing and inferencing pipeline may be streamlined because each application may call upon the same inference service to perform one or more inferencing tasks.

In at least one embodiment, hardware 1122 may include GPUs, CPUs, data processing units (DPUs), an AI/deep learning system (e.g., an AI supercomputer, such as NVIDIA's DGX™ supercomputer system), a cloud platform, or a combination thereof. In at least one embodiment, different types of hardware 1122 may be used to provide efficient, purpose-built support for software 1118 and service 1120 in deployment system 1106. In at least one embodiment, use of GPU processing may be implemented for processing locally (e.g., at facility 1102), within an AI/deep learning system, in a cloud system, and/or in other processing components of deployment system 1106 to improve efficiency, accuracy, and efficacy of game name recognition.

In at least one embodiment, software 1118 and/or service 1120 may be optimized for GPU processing with respect to deep learning, machine learning, and/or high-performance computing, simulation, and visual computing, as non-limiting examples. In at least one embodiment, at least some of the computing environment of deployment system 1106 and/or training system 1104 may be executed in a datacenter or one or more supercomputers or high performance computing systems, with GPU-optimized software (e.g., hardware and software combination of NVIDIA's DGX™ system). In at least one embodiment, hardware 1122 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC™) may be executed using an AI/deep learning supercomputer(s) and/or GPU-optimized software (e.g., as provided on NVIDIA's DGX™ systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 12 is a system diagram for an example system 1200 for generating and deploying a deployment pipeline, according to at least one embodiment. In at least one embodiment, system 1200 may be used to implement process 1100 of FIG. 11 and/or other processes including advanced processing and inferencing pipelines. In at least one embodiment, system 1200 may include training system 1104 and deployment system 1106. In at least one embodiment, training system 1104 and deployment system 1106 may be implemented using software 1118, services 1120, and/or hardware 1122, as described herein.

In at least one embodiment, system 1200 (e.g., training system 1104 and/or deployment system 1106) may implemented in a cloud computing environment (e.g., using cloud 1226). In at least one embodiment, system 1200 may be implemented locally with respect to a facility, or as a combination of both cloud and local computing resources. In at least one embodiment, access to APIs in cloud 1226 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1200, may be restricted to a set of public internet service providers (ISPs) that have been vetted or authorized for interaction.

In at least one embodiment, various components of system 1200 may communicate between and among one another using any of a variety of different network types, including but not limited to local area networks (LANs) and/or wide area networks (WANs) via wired and/or wireless communication protocols. In at least one embodiment, communication between facilities and components of system 1200 (e.g., for transmitting inference requests, for receiving results of inference requests, etc.) may be communicated over a data bus or data busses, wireless data protocols (e.g., Wi-Fi), wired data protocols (e.g., Ethernet), etc.

In at least one embodiment, training system 1104 may execute training pipelines 1204, similar to those described herein with respect to FIG. 11. In at least one embodiment, training system 1104 may include DICOM adapter 1202a. In at least one embodiment, where one or more machine learning models are to be used in deployment pipeline(s) 1210 by deployment system 1106, training pipeline(s) 1204 may be used to train or retrain one or more (e.g., pre-trained) models, and/or implement one or more of pre-trained models 1206 (e.g., without a need for retraining or updating). In at least one embodiment, as a result of training pipeline(s) 1204, output model(s) 1116 may be generated. In at least one embodiment, training pipeline(s) 1204 may include any number of processing steps, AI-assisted annotation 1110, labeling or annotating of feedback data 1108 to generate labeled data 1112, model selection from a model registry, model training 1114, training, retraining, or updating models, and/or other processing steps. In at least one embodiment, for different machine learning models used by deployment system 1106, different training pipeline(s) 1204 may be used. In at least one embodiment, training pipeline(s) 1204, similar to a first example described with respect to FIG. 11, may be used for a first machine learning model, training pipeline(s) 1204, similar to a second example described with respect to FIG. 11, may be used for a second machine learning model, and training pipeline(s) 1204, similar to a third example described with respect to FIG. 11, may be used for a third machine learning model. In at least one embodiment, any combination of tasks within training system 1104 may be used depending on what is required for each respective machine learning model. In at least one embodiment, one or more of machine learning models may already be trained and ready for deployment so machine learning models may not undergo any processing by training system 1104 and may be implemented by deployment system 1106.

In at least one embodiment, output model(s) 1116 and/or pre-trained models 1206 may include any types of machine learning models depending on embodiment. In at least one embodiment, and without limitation, machine learning models used by system 1200 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Bi-LSTM, Hopfield, Boltzmann, deep belief, deconvolutional, generative adversarial, liquid state machine, etc.), and/or other types of machine learning models.

In at least one embodiment, training pipeline(s) 1204 may include AI-assisted annotation. In at least one embodiment, labeled data 1112 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of feedback data 1108 (or other data type used by machine learning models), there may be corresponding ground truth data generated by training system 1104. In at least one embodiment, AI-assisted annotation may be performed as part of deployment pipeline(s) 1210; either in addition to, or in lieu of, AI-assisted annotation included in training pipeline(s) 1204. In at least one embodiment, system 1200 may include a multi-layer platform that may include a software layer (e.g., software 1118) of diagnostic applications (or other application types) that may perform one or more medical imaging and diagnostic functions.

In at least one embodiment, a software layer may be implemented as a secure, encrypted, and/or authenticated API through which applications or containers may be invoked (e.g., called) from an external environment(s), e.g., facility 1102. In at least one embodiment, applications may then call or execute one or more services 1120 for performing compute, AI, or visualization tasks associated with respective applications, and software 1118 and/or services 1120 may leverage hardware 1122 to perform processing tasks in an effective and efficient manner.

In at least one embodiment, deployment system 1106 may execute deployment pipelines 1210. In at least one embodiment, deployment system 1106 may include DICOM adapter 1202b. In at least one embodiment, deployment pipeline(s) 1210 may include any number of applications that may be sequentially, non-sequentially, or otherwise applied to feedback data (and/or other data types), including AI-assisted annotation, as described above. In at least one embodiment, as described herein, a deployment pipeline(s) 1210 for an individual device may be referred to as a virtual instrument for a device. In at least one embodiment, for a single device, there may be more than one deployment pipeline(s) 1210 depending on information desired from data generated by a device.

In at least one embodiment, applications available for deployment pipeline(s) 1210 may include any application that may be used for performing processing tasks on feedback data or other data from devices. In at least one embodiment, because various applications may share common image operations, in some embodiments, a data augmentation library (e.g., as one of services 1120) may be used to accelerate these operations. In at least one embodiment, to avoid bottlenecks of conventional processing approaches that rely on CPU processing, parallel computing platform 1230 may be used for GPU acceleration of these processing tasks.

In at least one embodiment, deployment system 1106 may include a user interface (UI) 1214 (e.g., a graphical user interface, a web interface, etc.) that may be used to select applications for inclusion in deployment pipeline(s) 1210, arrange applications, modify or change applications or parameters or constructs thereof, use and interact with deployment pipeline(s) 1210 during set-up and/or deployment, and/or to otherwise interact with deployment system 1106. In at least one embodiment, although not illustrated with respect to training system 1104, UI 1214 (or a different user interface) may be used for selecting models for use in deployment system 1106, for selecting models for training, or retraining, in training system 1104, and/or for otherwise interacting with training system 1104.

In at least one embodiment, pipeline manager 1212 may be used, in addition to an application orchestration system 1228, to manage interaction between applications or containers of deployment pipeline(s) 1210 and services 1120 and/or hardware 1122. In at least one embodiment, pipeline manager 1212 may be configured to facilitate interactions from application to application, from application to service 1120, and/or from application or service to hardware 1122. In at least one embodiment, although illustrated as included in software 1118, this is not intended to be limiting, and in some examples pipeline manager 1212 may be included in services 1120. In at least one embodiment, application orchestration system 1228 (e.g., Kubernetes, DOCKER, etc.) may include a container orchestration system that may group applications into containers as logical units for coordination, management, scaling, and deployment. In at least one embodiment, by associating applications from deployment pipeline(s) 1210 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of other application(s) or container(s). In at least one embodiment, communication, and cooperation between different containers or applications may be aided by pipeline manager 1212 and application orchestration system 1228. In at least one embodiment, so long as an expected input and/or output of each container or application is known by a system (e.g., based on constructs of applications or containers), application orchestration system 1228 and/or pipeline manager 1212 may facilitate communication among and between, and sharing of resources among and between, each of the applications or containers. In at least one embodiment, because one or more of applications or containers in deployment pipeline(s) 1210 may share the same services and resources, application orchestration system 1228 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, the scheduler may thus allocate resources to different applications and distribute resources between and among applications in view of requirements and availability of a system. In some examples, the scheduler (and/or other component of application orchestration system 1228) may determine resource availability and distribution based on constraints imposed on a system (e.g., user constraints), such as quality of service (QOS), urgency of need for data outputs (e.g., to determine whether to execute real-time processing or delayed processing), etc.

In at least one embodiment, services 1120 leveraged and shared by applications or containers in deployment system 1106 may include compute service(s) 1216, collaborative content creation service(s) 1217, AI service(s) 1218, simulation service(s) 1219, visualization service(s) 1220, and/or other service types. In at least one embodiment, applications may call (e.g., execute) one or more of services 1120 to perform processing operations for an application. In at least one embodiment, compute service(s) 1216 may be leveraged by applications to perform super-computing or other high-performance computing (HPC) tasks. In at least one embodiment, compute service(s) 1216 may be leveraged to perform parallel processing (e.g., using a parallel computing platform 1230) for processing data through one or more of applications and/or one or more tasks of a single application, substantially simultaneously. In at least one embodiment, parallel computing platform 1230 (e.g., NVIDIA's CUDA®) may enable general purpose computing on GPUs (GPGPU) (e.g., GPUs/graphics 1222). In at least one embodiment, a software layer of parallel computing platform 1230 may provide access to virtual instruction sets and parallel computational elements of GPUs, for execution of compute kernels. In at least one embodiment, parallel computing platform 1230 may include memory and, in some embodiments, a memory may be shared between and among multiple containers and/or between and among different processing tasks within a single container. In at least one embodiment, inter-process communication (IPC) calls may be generated for multiple containers and/or for multiple processes within a container to use same data from a shared segment of memory of parallel computing platform 1230

(e.g., where multiple different stages of an application or multiple applications are processing same information). In at least one embodiment, rather than making a copy of data and moving data to different locations in memory (e.g., a read/write operation), same data in the same location of a memory may be used for any number of processing tasks (e.g., at the same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI service(s) 1218 may be leveraged to perform inferencing services for executing machine learning model(s) associated with applications (e.g., tasked with performing one or more processing tasks of an application). In at least one embodiment, AI service(s) 1218 may leverage AI system(s) 1224 to execute machine learning model(s) (e.g., neural networks, such as CNNs) for segmentation, reconstruction, object detection, feature detection, classification, and/or other inferencing tasks. In at least one embodiment, applications of deployment pipeline(s) 1210 may use one or more of output model(s) 1116 from training system 1104 and/or other models of applications to perform inference on imaging data (e.g., DICOM data, RIS data, CIS data, REST compliant data, RPC data, raw data, etc.). In at least one embodiment, two or more examples of inferencing using application orchestration system 1228 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1228 may distribute resources (e.g., services 1120 and/or hardware 1122) based on priority paths for different inferencing tasks of AI service (s) 1218.

In at least one embodiment, shared storage may be mounted to AI service(s) 1218 within system 1200. In at least one embodiment, shared storage may operate as a cache (or other storage device type) and may be used to process inference requests from applications. In at least one embodiment, when an inference request is submitted, a request may be received by a set of API instances of deployment system 1106, and one or more instances may be selected (e.g., for best fit, for load balancing, etc.) to process a request. In at least one embodiment, to process a request, a request may be entered into a database, a machine learning model may be located from model registry 1124 if not already in a cache, a validation step may ensure an appropriate machine learning model is loaded into a cache (e.g., shared storage), and/or a copy of a model may be saved to a cache. In at least one embodiment, the scheduler (e.g., of pipeline manager 1212) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as the inference server is running as a different instance.

In at least one embodiment, during application execution, an inference request for a given application may be received, and a container (e.g., hosting an instance of an inference server) may be loaded (if not already loaded), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel-level segmentation, voxel-level segmentation, generating a visualization, or generating text to summarize findings. In at least one embodiment, different models or applications may be assigned different priorities. For example, some models may have a real-time (turnaround time less than one minute) priority while others may have lower priority (e.g., turnaround less than 10 minutes). In at least one embodiment, model execution times may be measured from requesting institution or entity and may include partner network traversal time, as well as execution on an inference service.

In at least one embodiment, transfer of requests between services 1120 and inference applications may be hidden behind a software development kit (SDK), and robust transport may be provided through a queue. In at least one embodiment, a request is placed in a queue via an API for an individual application/tenant ID combination and an SDK pulls a request from a queue and gives a request to an application. In at least one embodiment, a name of a queue may be provided in an environment from where an SDK picks up the request. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1226, and an inference service may perform inferencing on a GPU.

In at least one embodiment, visualization service(s) 1220 may be leveraged to generate visualizations for viewing outputs of applications and/or deployment pipeline(s) 1210. In at least one embodiment, GPUs/graphics 1222 may be leveraged by visualization service(s) 1220 to generate visualizations. In at least one embodiment, rendering effects, such as ray-tracing or other light transport simulation techniques, may be implemented by visualization service(s) 1220 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization service(s) 1220 may include an internal visualizer, cinematics, and/or other rendering or image processing capabilities or functionality (e.g., ray tracing, rasterization, internal optics, etc.).

In at least one embodiment, hardware 1122 may include GPUs/graphics 1222, AI system(s) 1224, cloud 1226, and/or any other hardware used for executing training system 1104 and/or deployment system 1106. In at least one embodiment, GPUs/graphics 1222 (e.g., NVIDIA's TESLA® and/or QUADRO® GPUs) may include any number of GPUs that may be used for executing processing tasks of compute service(s) 1216, collaborative content creation service(s) 1217, AI service(s) 1218, simulation service(s) 1219, visualization service(s) 1220, other services, and/or any of features or functionality of software 1118. For example, with respect to AI service(s) 1218, GPUs/graphics 1222 may be used to perform pre-processing on imaging data (or other data types used by machine learning models), post-processing on outputs of machine learning models, and/or to perform inferencing (e.g., to execute machine learning models). In at least one embodiment, cloud 1226, AI system(s) 1224, and/or other components of system 1200 may use GPUs/graphics 1222. In at least one embodiment, cloud 1226 may include a GPU-optimized platform for deep learning tasks. In at least one embodiment, AI system(s) 1224 may use GPUs, and cloud 1226—or at least a portion tasked with deep learning or inferencing—may be executed using one or more AI system(s) s 1224. As such, although hardware 1122 is illustrated as discrete components, this is not intended to be limiting, and any components of hardware 1122 may be combined with, or leveraged by, any other components of hardware 1122.

In at least one embodiment, AI system(s) 1224 may include a purpose-built computing system (e.g., a supercomputer or an HPC) configured for inferencing, deep learning, machine learning, and/or other artificial intelligence tasks. In at least one embodiment, AI system(s) 1224 (e.g., NVIDIA's DGX™) may include GPU-optimized software (e.g., a software stack) that may be executed using a plurality of GPUs/graphics 1222, in addition to CPUs, RAM, storage, and/or other components, features, or functionality. In at least one embodiment, one or more AI system(s) s 1224 may be implemented in cloud 1226 (e.g., in a data center) for performing some or all of AI-based processing tasks of system 1200.

In at least one embodiment, cloud 1226 may include a GPU-accelerated infrastructure (e.g., NVIDIA's NGC™) that may provide a GPU-optimized platform for executing processing tasks of system 1200. In at least one embodiment, cloud 1226 may include an AI system(s) 1224 for performing one or more of AI-based tasks of system 1200 (e.g., as a hardware abstraction and scaling platform). In at least one embodiment, cloud 1226 may integrate with application orchestration system 1228 leveraging multiple GPUs to enable seamless scaling and load balancing between and among applications and services 1120. In at least one embodiment, cloud 1226 may be tasked with executing at least some of services 1120 of system 1200, including compute service(s) 1216, AI service(s) 1218, and/or visualization service(s) 1220, as described herein. In at least one embodiment, cloud 1226 may perform small and large batch inference (e.g., executing NVIDIA's TensorRT™), provide an accelerated parallel computing platform 1230 (e.g., NVIDIA's CUDA®), execute application orchestration system 1228 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1200. In at least one embodiment, parallel computing platform 1230 may include an API.

In at least one embodiment, in an effort to preserve patient confidentiality (e.g., where patient data or records are to be used off-premises), cloud 1226 may include a registry, such as a deep learning container registry. In at least one embodiment, a registry may store containers for instantiations of applications that may perform pre-processing, post-processing, or other processing tasks on patient data. In at least one embodiment, cloud 1226 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, a number of items in a plurality is at least two but can be more when so indicated either explicitly or by context. Further, unless stated otherwise or otherwise clear from context, the phrase "based on" means "based at least in part on" or "based at least on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, in some embodiments, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as a system may embody one or more methods and methods may be considered a system.

In the present document, references may be made to obtaining, acquiring, receiving, or inputting analog or digital data into a subsystem, computer system, or computer-implemented machine. In at least one embodiment, a process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
receiving, using a worker, a first execution request from a queue managed by a controller;
executing a first instance of a particular code based on the first execution request using at least a graphics processing unit (GPU) of a cluster environment hosting the worker;
during execution of the first instance of the particular code, determining, using the worker, first metrics of the GPU of the cluster environment;
responsive to the first metrics of the GPU satisfying a bandwidth criterion, requesting, using the worker, a second execution request from the queue managed by the controller; and
executing, at least partially concurrently with execution of the first instance of the particular code, a second instance of the particular code based on the second execution request using at least the GPU of the cluster environment.

2. The method of claim 1, further comprising:
providing a first execution result corresponding to executing the first instance of the particular code to the controller; and
providing a second execution result corresponding to executing the second instance of the particular code to the controller.

3. The method of claim 2, wherein providing the first execution result corresponding to executing the first instance of the particular code to the controller comprises:
causing the first execution result to be transmitted to a storage device; and
causing a storage identifier associated with the first execution result to be transmitted to the controller.

4. The method of claim 1, wherein the first execution request comprises input data, and wherein executing the first instance of the particular code based on the first execution request comprises providing the input data of the first execution request to the first instance of the particular code.

5. The method of claim 1, wherein the first execution request comprises an input data identifier, the method further comprising:
accessing an input data associated with the input data identifier from a storage device, wherein executing the first instance of the particular code based on the first execution request comprises providing the input data to the first instance of the particular code.

6. The method of claim 1, further comprising causing periodic heartbeat requests to be transmitted to the controller.

7. The method of claim 1, further comprising:
generating a progress indicator artifact corresponding to a progress of executing the first instance of the particular code; and
causing the progress indicator artifact to be transmitted to the controller.

8. A system comprising:
one or more processing devices to perform operations comprising:
receiving, using a worker, a first execution request from a queue managed by a controller;
executing a first instance of a particular code based on the first execution request using at least a graphics processing unit (GPU) of a cluster environment hosting the worker;
during execution of the first instance of the particular code, determining, using the worker, first metrics of the GPU of the cluster environment;
responsive to the first metrics of the GPU satisfying a bandwidth criterion, requesting, using the worker, a second execution request from the queue managed by the controller; and
executing, at least partially concurrently with execution of the first instance of the particular code, a second instance of the particular code based on the second execution request using at least the GPU of the cluster environment.

9. The system of claim 8, the operations further comprising:
providing a first execution result corresponding to executing the first instance of the particular code to the controller; and
providing a second execution result corresponding to executing the second instance of the particular code to the controller.

10. The system of claim 9, wherein providing the first execution result corresponding to executing the first instance of the particular code to the controller comprises:
causing the first execution result to be transmitted to a storage device; and
causing a storage identifier associated with the first execution result to be transmitted to the controller.

11. The system of claim 8, wherein the first execution request comprises input data, and wherein executing the first instance of the particular code based on the first execution request comprises providing the input data of the first execution request to the first instance of the particular code.

12. The system of claim 8, wherein the first execution request comprises an input data identifier, the operations further comprising:
accessing an input data associated with the input data identifier from a storage device, wherein executing the first instance of the particular code based on the first execution request comprises providing the input data to the first instance of the particular code.

13. The system of claim 8, the operations further comprising causing periodic heartbeat requests to be transmitted to the controller.

14. The system of claim 8, the operations further comprising:

generating a progress indicator artifact corresponding to a progress of executing the first instance of the particular code; and causing the progress indicator artifact to be transmitted to the controller.

15. A processor comprising one or more processing units to:

receive, using a worker, a first execution request from a queue managed by a controller;

execute a first instance of a particular code based on the first execution request using at least a graphics processing unit (GPU) of a cluster environment hosting the worker;

during execution of the first instance of the particular code, determine, using the worker, first metrics of the GPU of the cluster environment;

responsive to the first metrics of the GPU satisfying a bandwidth criterion, request, using the worker, a second execution request from the queue managed by the controller; and execute, at least partially concurrently with execution of the first instance of the particular code, a second instance of the particular code based on the second execution request using at least the GPU of the cluster environment.

16. The processor of claim 15, wherein the one or more processing units are further to:

provide a first execution result corresponding to executing the first instance of the particular code to the controller; and provide a second execution result corresponding to executing the second instance of the particular code to the controller.

17. The processor of claim 16, wherein to provide the first execution result corresponding to executing the first instance of the particular code to the controller, the one or more processing units are to:

cause the first execution result to be transmitted to a storage device; and cause a storage identifier associated with the first execution result to be transmitted to the controller.

18. The processor of claim 15, wherein the first execution request comprises input data, and wherein to execute the first instance of the particular code based on the first execution request, the one or more processing units are to provide the input data of the first execution request to the first instance of the particular code.

19. The processor of claim 15, wherein the first execution request comprises an input data identifier, and wherein the one or more processing units are further to:

access an input data associated with the input data identifier from a storage device, wherein to execute the first instance of the particular code based on the first execution request, the one or more processing units are to provide the input data to the first instance of the particular code.

20. The processor of claim 15, wherein the one or more processing units are further to cause periodic heartbeat requests to be transmitted to the controller.

* * * * *